(12) United States Patent
Qiu et al.

(10) Patent No.: US 10,644,531 B1
(45) Date of Patent: May 5, 2020

(54) ADAPTABLE POWER RECTIFIER FOR WIRELESS CHARGER SYSTEM

(71) Applicant: Apple Inc., Cupertino, CA (US)

(72) Inventors: Weihong Qiu, San Ramon, CA (US); Rohan Dayal, Mountain View, CA (US); Zaki Moussaoui, San Carlos, CA (US)

(73) Assignee: APPLE INC., Cupertino, CA (US)

( * ) Notice: Subject to any disclaimer, the term of this patent is extended or adjusted under 35 U.S.C. 154(b) by 323 days.

(21) Appl. No.: 15/468,001

(22) Filed: Mar. 23, 2017

Related U.S. Application Data

(60) Provisional application No. 62/398,127, filed on Sep. 22, 2016.

(51) Int. Cl.
| | | |
|---|---|---|
| *H02J 7/04* | (2006.01) | |
| *H02J 7/02* | (2016.01) | |
| *H02J 50/12* | (2016.01) | |
| *H02M 7/219* | (2006.01) | |

(52) U.S. Cl.
CPC .............. *H02J 7/045* (2013.01); *H02J 7/025* (2013.01); *H02J 50/12* (2016.02); *H02M 7/219* (2013.01)

(58) Field of Classification Search
CPC ......... H02J 7/045; H02M 7/219; H02M 3/335
USPC ....................... 320/108, 163, 166; 363/16, 88
See application file for complete search history.

(56) References Cited

U.S. PATENT DOCUMENTS

| | | | |
|---|---|---|---|
| 4,268,899 A | 5/1981 | Rokas | |
| 5,293,308 A | 3/1994 | Boys et al. | |
| 5,479,486 A | 12/1995 | Saji | |
| 5,639,989 A | 6/1997 | Higgins, III | |
| 6,198,260 B1 | 3/2001 | Wittenbreder | |
| 6,960,968 B2 | 11/2005 | Odenaal et al. | |
| 6,972,543 B1 | 12/2005 | Wells | |
| 7,339,558 B2 | 3/2008 | Chen et al. | |
| 7,641,358 B1 | 1/2010 | Smith et al. | |
| 7,893,564 B2 | 2/2011 | Bennett | |
| 7,948,208 B2 | 5/2011 | Partovi et al. | |
| 7,952,322 B2 | 5/2011 | Partovi et al. | |
| 8,024,491 B1 | 9/2011 | Wright et al. | |
| 8,054,651 B2 | 11/2011 | Pollard | |
| 8,134,416 B2 | 3/2012 | Moiraghi et al. | |
| 8,169,151 B2 | 5/2012 | Kimura | |
| 8,169,185 B2 | 5/2012 | Partovi et al. | |
| 8,274,178 B2 | 9/2012 | Tucker | |

(Continued)

FOREIGN PATENT DOCUMENTS

| | | |
|---|---|---|
| CN | 1826715 | 8/2006 |
| CN | 101243374 | 8/2006 |

(Continued)

OTHER PUBLICATIONS

U.S. Appl. No. 16/133,195, filed Sep. 17, 2018, Moyer et al.

(Continued)

*Primary Examiner* — Edward Tso
*Assistant Examiner* — Aaron Piggush
(74) *Attorney, Agent, or Firm* — Brownstein Hyatt Farber Schreck, LLP

(57) ABSTRACT

A power converter including a rectifier circuit and a method for rectifying an incoming alternating current. The rectifier circuit may alter its output voltage according to varying conditions of the power converter. The variations may include voltage changes at the input or output.

20 Claims, 12 Drawing Sheets

(56) References Cited

U.S. PATENT DOCUMENTS

| | | |
|---|---|---|
| 8,278,784 B2 | 10/2012 | Cook |
| 8,329,376 B2 | 11/2012 | Kitamura et al. |
| 8,332,547 B2 | 12/2012 | Sugaya |
| 8,362,744 B2 | 1/2013 | Terao et al. |
| 8,415,834 B2 | 4/2013 | Suzuki et al. |
| 8,421,274 B2 | 4/2013 | Son et al. |
| 8,446,046 B2 | 5/2013 | Fells et al. |
| 8,482,250 B2 | 7/2013 | Soar |
| 8,629,652 B2 | 1/2014 | Partovi et al. |
| 8,629,654 B2 | 1/2014 | Partovi et al. |
| 8,663,106 B2 | 3/2014 | Stivoric |
| 8,716,974 B2 | 5/2014 | Sakoda et al. |
| 8,729,852 B2 | 5/2014 | Tsai et al. |
| 8,742,625 B2 | 6/2014 | Baarman et al. |
| 8,810,071 B2 | 8/2014 | Sauerlaender et al. |
| 8,853,892 B2 | 10/2014 | Fells et al. |
| 8,884,469 B2 | 11/2014 | Lemmens |
| 8,890,470 B2 | 11/2014 | Partovi et al. |
| 8,896,264 B2 | 11/2014 | Partovi |
| 8,901,881 B2 | 12/2014 | Partovi et al. |
| 8,922,525 B2 | 12/2014 | Chen et al. |
| 8,947,047 B2 | 2/2015 | Partovi et al. |
| 9,018,904 B2 | 4/2015 | Seyerle et al. |
| 9,030,421 B2 | 5/2015 | Tseng et al. |
| 9,041,346 B2 | 5/2015 | Nakama |
| 9,048,682 B2 | 6/2015 | Lee et al. |
| 9,057,753 B2 | 6/2015 | Nakano et al. |
| 9,093,857 B2 | 7/2015 | Sakai et al. |
| 9,099,867 B2 | 8/2015 | Park |
| 9,099,885 B2 | 8/2015 | Kamata |
| 9,106,083 B2 | 8/2015 | Partovi |
| 9,112,362 B2 | 8/2015 | Partovi |
| 9,112,363 B2 | 8/2015 | Partovi |
| 9,112,364 B2 | 8/2015 | Partovi |
| 9,124,112 B2 | 9/2015 | Havass et al. |
| 9,126,490 B2 | 9/2015 | Cook |
| 9,148,201 B2 | 9/2015 | Kallal et al. |
| 9,154,189 B2 | 10/2015 | Von Novak et al. |
| 9,160,180 B2 | 10/2015 | Suzuki et al. |
| 9,178,369 B2 | 11/2015 | Partovi |
| 9,197,065 B2 | 11/2015 | Divan et al. |
| 9,197,070 B2 | 11/2015 | Jung |
| 9,197,082 B1 | 11/2015 | Zhang |
| 9,231,411 B2 | 1/2016 | Baarman et al. |
| 9,270,138 B2 | 2/2016 | Yamakawa et al. |
| 9,276,437 B2 | 3/2016 | Partovi et al. |
| 9,312,753 B2 | 4/2016 | Zhou et al. |
| 9,318,915 B2 | 4/2016 | Miller et al. |
| 9,325,200 B2 | 4/2016 | Nishiwaki |
| 9,352,661 B2 | 5/2016 | Keeling et al. |
| 9,356,659 B2 | 5/2016 | Partovi |
| 9,376,027 B2 | 6/2016 | Harris |
| 9,407,107 B2 | 8/2016 | Park et al. |
| 9,410,823 B2 | 8/2016 | Widmer et al. |
| 9,444,266 B2 | 9/2016 | Van Wageningen et al. |
| 9,460,846 B2 | 10/2016 | Graham et al. |
| 9,461,501 B2 | 10/2016 | Partovi et al. |
| 9,461,502 B2 | 10/2016 | Lee |
| 9,496,731 B2 | 11/2016 | Park et al. |
| 9,496,732 B2 | 11/2016 | Partovi et al. |
| 9,507,447 B2 | 11/2016 | Yilmaz |
| 9,509,374 B2 | 11/2016 | Kim et al. |
| 9,515,514 B2 | 12/2016 | Lee et al. |
| 9,531,300 B2 | 12/2016 | Harrison et al. |
| 9,537,363 B2 | 1/2017 | Bossetti et al. |
| 9,553,485 B2 | 1/2017 | Singh et al. |
| 9,564,776 B2 | 2/2017 | Lampinen |
| 9,577,440 B2 | 2/2017 | Partovi et al. |
| 9,685,802 B1 | 6/2017 | Mirov |
| 9,685,814 B1 | 6/2017 | Moyer et al. |
| 9,716,433 B2 | 7/2017 | Coleman et al. |
| 9,754,717 B2 | 9/2017 | Long et al. |
| 9,793,761 B2 | 10/2017 | Sampei et al. |
| 9,800,076 B2 | 10/2017 | Jadidian et al. |
| 9,811,204 B2 | 11/2017 | Sauer et al. |
| 9,813,041 B1 | 11/2017 | Ritter |
| 9,831,787 B1 | 11/2017 | Halberstadt |
| 9,958,904 B2 | 5/2018 | von Badinski et al. |
| 10,027,130 B2 | 7/2018 | Cho et al. |
| 10,027,185 B2 | 7/2018 | Moyer |
| 10,032,557 B1 | 7/2018 | Bossetti |
| 10,116,169 B2 | 10/2018 | Cho et al. |
| 2001/0044588 A1 | 11/2001 | Mault |
| 2005/0068792 A1* | 3/2005 | Yasumura ............... H01F 30/04 363/21.06 |
| 2008/0174268 A1 | 7/2008 | Koo et al. |
| 2008/0284609 A1 | 11/2008 | Rofougaran |
| 2009/0067208 A1* | 3/2009 | Martin .................... H02J 17/00 363/126 |
| 2009/0146608 A1 | 6/2009 | Lee |
| 2010/0201315 A1 | 8/2010 | Oshimi et al. |
| 2010/0328044 A1 | 12/2010 | Waffenschmidt et al. |
| 2011/0019452 A1* | 1/2011 | Shinomoto ......... H02M 1/4208 363/126 |
| 2011/0050164 A1 | 3/2011 | Partovi et al. |
| 2011/0109264 A1 | 5/2011 | Choi |
| 2011/0136550 A1 | 6/2011 | Maugars |
| 2011/0198937 A1 | 8/2011 | Tseng |
| 2011/0221387 A1 | 9/2011 | Steigerwald et al. |
| 2011/0234012 A1 | 9/2011 | Yi et al. |
| 2011/0241615 A1 | 10/2011 | Yeh |
| 2011/0254379 A1 | 10/2011 | Madawala |
| 2011/0302078 A1 | 12/2011 | Failing |
| 2012/0068550 A1 | 3/2012 | De Boer et al. |
| 2012/0169139 A1 | 7/2012 | Kudo |
| 2012/0255039 A1 | 10/2012 | Sipes |
| 2012/0313577 A1 | 12/2012 | Moes et al. |
| 2013/0076648 A1 | 3/2013 | Krah et al. |
| 2013/0093388 A1 | 4/2013 | Partovi |
| 2013/0099563 A1 | 4/2013 | Partovi et al. |
| 2013/0101127 A1 | 4/2013 | Buchmann |
| 2013/0214909 A1 | 8/2013 | Meijers et al. |
| 2013/0260677 A1 | 10/2013 | Partovi |
| 2013/0271069 A1 | 10/2013 | Partovi |
| 2013/0285605 A1 | 10/2013 | Partovi |
| 2013/0300204 A1 | 11/2013 | Partovi |
| 2013/0334326 A1 | 12/2013 | Shan |
| 2014/0015327 A1 | 1/2014 | Keeling et al. |
| 2014/0035378 A1 | 2/2014 | Kesler et al. |
| 2014/0129010 A1 | 5/2014 | Garg |
| 2014/0132210 A1 | 5/2014 | Partovi |
| 2014/0159501 A1 | 6/2014 | Kanno et al. |
| 2014/0159656 A1 | 6/2014 | Riehl |
| 2014/0191568 A1 | 7/2014 | Partovi |
| 2014/0191818 A1 | 7/2014 | Waffenschmidt et al. |
| 2014/0197687 A1 | 7/2014 | Lin |
| 2014/0197782 A1 | 7/2014 | Graf et al. |
| 2014/0225439 A1 | 8/2014 | Mao |
| 2014/0266018 A1 | 9/2014 | Carobolante |
| 2014/0306654 A1 | 10/2014 | Partovi |
| 2014/0347007 A1 | 11/2014 | Kee et al. |
| 2015/0001950 A1 | 1/2015 | Chung et al. |
| 2015/0022194 A1 | 1/2015 | Almalki |
| 2015/0035372 A1 | 2/2015 | Aioanei |
| 2015/0280455 A1 | 3/2015 | Bosshard et al. |
| 2015/0130412 A1 | 5/2015 | Partovi |
| 2015/0207333 A1 | 7/2015 | Baarman et al. |
| 2015/0214750 A1 | 7/2015 | Moshkovich et al. |
| 2015/0215006 A1 | 7/2015 | Mehas et al. |
| 2015/0244179 A1 | 8/2015 | Ritter et al. |
| 2015/0244341 A1 | 8/2015 | Ritter et al. |
| 2015/0270058 A1 | 9/2015 | Golko et al. |
| 2015/0333530 A1 | 11/2015 | Moyer et al. |
| 2015/0349538 A1 | 12/2015 | Agostinelli et al. |
| 2015/0364931 A1 | 12/2015 | Ren et al. |
| 2016/0043567 A1 | 2/2016 | Matumoto et al. |
| 2016/0049796 A1 | 2/2016 | Cho et al. |
| 2016/0056664 A1 | 2/2016 | Partovi |
| 2016/0064948 A1 | 3/2016 | Heresztyn et al. |
| 2016/0064992 A1 | 3/2016 | Herbst et al. |
| 2016/0072306 A1 | 3/2016 | Tsuda |
| 2016/0127672 A1 | 5/2016 | Kamide et al. |
| 2016/0172894 A1 | 6/2016 | Khripkov et al. |
| 2016/0181849 A1 | 6/2016 | Govindaraj |

(56) References Cited

U.S. PATENT DOCUMENTS

| | | |
|---|---|---|
| 2016/0261137 A1 | 9/2016 | Riehl |
| 2016/0285278 A1 | 9/2016 | Mehas et al. |
| 2017/0012463 A1 | 1/2017 | Lynch |
| 2017/0089959 A1 | 3/2017 | Ito et al. |
| 2017/0110911 A1 | 4/2017 | Bossetti et al. |
| 2017/0222493 A1 | 8/2017 | Oki et al. |
| 2018/0013312 A1 | 1/2018 | Moyer et al. |
| 2018/0062443 A1 | 3/2018 | Cho et al. |
| 2018/0233955 A1 | 8/2018 | Park et al. |
| 2018/0294682 A1 | 10/2018 | Qiu et al. |
| 2018/0294742 A1 | 10/2018 | Qiu et al. |
| 2019/0006892 A1 | 1/2019 | Heresztyn et al. |
| 2019/0020213 A1 | 1/2019 | Moyer et al. |
| 2019/0157898 A1 | 5/2019 | Herbst et al. |

FOREIGN PATENT DOCUMENTS

| | | |
|---|---|---|
| CN | 101232190 | 7/2008 |
| CN | 101777801 | 7/2010 |
| CN | 101814757 | 8/2010 |
| CN | 102055250 | 5/2011 |
| CN | 102113195 | 6/2011 |
| CN | 102124624 | 7/2011 |
| CN | 102257696 | 11/2011 |
| CN | 102355035 | 2/2012 |
| CN | 102396132 | 3/2012 |
| CN | 202712982 | 1/2013 |
| CN | 102998711 | 3/2013 |
| CN | 103019485 | 4/2013 |
| CN | 202976038 | 6/2013 |
| CN | 103248132 | 8/2013 |
| CN | 103269092 | 8/2013 |
| CN | 103324333 | 9/2013 |
| CN | 103326475 | 9/2013 |
| CN | 103457362 | 12/2013 |
| CN | 103518175 | 1/2014 |
| CN | 103545893 | 1/2014 |
| CN | 103597711 | 2/2014 |
| CN | 103765722 | 4/2014 |
| CN | 103812162 | 5/2014 |
| CN | 103999320 | 8/2014 |
| CN | 104037750 | 9/2014 |
| EP | 1633122 | 8/2005 |
| EP | 2642628 | 9/2013 |
| GB | 2484999 | 5/2012 |
| JP | H06311658 | 4/1994 |
| JP | H06268565 | 9/1994 |
| JP | H08149608 | 6/1996 |
| JP | H08331850 | 12/1996 |
| JP | H10173741 | 6/1998 |
| JP | 2001069388 | 3/2001 |
| JP | 2001333551 | 11/2001 |
| JP | 2010161882 | 7/2010 |
| JP | 2010268531 | 11/2010 |
| JP | 2011120443 | 6/2011 |
| JP | 2011259612 | 12/2011 |
| JP | 2012503959 | 2/2012 |
| JP | 2013115929 | 6/2013 |
| JP | 2013183497 | 9/2013 |
| JP | 2013536664 | 9/2013 |
| JP | 2014023281 | 3/2014 |
| JP | 2014193097 | 10/2014 |
| KR | 1020070023337 | 2/2007 |
| KR | 1020120097155 | 9/2012 |
| KR | 20130055199 | 5/2013 |
| KR | 20140061337 | 5/2014 |
| WO | WO 09/045847 | 4/2009 |
| WO | WO 10/077991 | 7/2010 |
| WO | WO 10/108191 | 9/2010 |
| WO | WO 11/156555 | 12/2011 |
| WO | WO 12/085119 | 6/2012 |
| WO | WO 13/011905 | 1/2013 |
| WO | WO 13/122625 | 8/2013 |
| WO | WO 14/034966 | 3/2014 |
| WO | WO 15/102113 | 7/2015 |
| WO | WO 16/024869 | 2/2016 |

OTHER PUBLICATIONS

U.S. Appl. No. 15/393,435, filed Dec. 29, 2016, Bossetti et al.
U.S. Appl. No. 15/626,930, filed Jun. 19, 2017, Moyer et al.
U.S. Appl. No. 15/829,610, filed Dec. 1, 2017, Qiu et al.
U.S. Appl. No. 15/829,850, filed Dec. 1, 2017, Qiu et al.

\* cited by examiner

ADAPTABLE POWER RECTIFIER FOR WIRELESS CHARGER SYSTEM

CROSS-REFERENCE TO RELATED APPLICATION

This application is a nonprovisional patent application of U.S. Patent Application No. 62/398,127, filed Sep. 22, 2016 and titled "Adaptable Power Rectifier for Wireless Charger System," the disclosure of which is hereby incorporated herein by reference in its entirety.

FIELD

Embodiments described herein generally relate to power converters and, in particular, to systems and methods for operating rectifying circuitry adaptable to the characteristics of incoming power.

BACKGROUND

An electronic device can receive electric power from a power source. The electronic device can include a power conversion and/or regulation circuit to change one or more characteristics of power received from the power source into a form usable by one or more components of the electronic device. In many examples, the power conversion and/or regulation circuit includes a rectifier circuit. A rectifier circuit typically operates in a single mode, such as a half-wave rectifier, a full-wave rectifier circuit, or a voltage doubler rectifier.

SUMMARY

Embodiments described herein generally relate to a power converter including a rectifier circuit. The rectifier circuit is configured to adaptably rectify an alternating current into a direct current, under varying conditions such as a changing input voltage or changing load demands. In an example embodiment, the power converter includes a first inductive coil configured to output a first induced current and a second inductive coil configured to output a second induced current. The power converter further includes a rectifier circuit, which includes a set of voltage-controlled switches coupled to the first inductive coil and the second inductive coil.

The rectifier circuit is configured to switch between a full-wave rectifying mode and a voltage doubler rectifying mode by selectively controlling the conduction state of each voltage-controlled switch of the set of voltage-controlled switches. Processing circuitry is configured to cause the rectifier circuit to switch between the full-wave rectifying mode and the voltage doubler rectifying mode.

In some examples, the processing circuitry is configured to monitor a voltage at the first inductive coil and cause the rectifier circuit to switch to the voltage doubler rectifying mode in response to the voltage being below a threshold. In other examples, the processing circuitry is configured to monitor a voltage at the first inductive coil and cause the rectifier circuit to switch to the full-wave rectifying mode in response to the voltage exceeding a threshold.

In another embodiment, a voltage rectifier includes an output. The output is connected parallel to: a first voltage-controlled switch connected in series with a second voltage-controlled switch; a third voltage-controlled switch connected in series with a fourth voltage-controlled switch; and a fifth voltage-controlled switch connected in series with a sixth voltage-controlled switch. The voltage rectifier includes a first alternating current input and a second alternating current input. The first alternating current input has a first node connected between the third voltage-controlled switch and the fourth voltage-controlled switch and a second node connected between the fifth voltage-controlled switch and the sixth voltage-controlled switch. The second alternating current input has a third node connected between the fifth voltage-controlled switch and the sixth voltage-controlled switch and a fourth node connected between the first voltage-controlled switch and the second voltage-controlled switch. Processing circuitry is configured to operate the sixth voltage-controlled switch to operate the voltage rectifier in a secondary mode.

In still another embodiment, a voltage rectifier includes an output. The output is connected parallel to: a first voltage-controlled switch connected in series with a second voltage-controlled switch; a third voltage-controlled switch connected in series with a fourth voltage-controlled switch; and a fifth voltage-controlled switch connected in series with a sixth voltage-controlled switch. The voltage rectifier includes a first alternating current input and a second alternating current input. The first alternating current input has a first node connected between the third voltage-controlled switch and the fourth voltage-controlled switch and a second node connected between the fifth voltage-controlled switch and the sixth voltage-controlled switch. The second alternating current input has a third node connected between the first voltage-controlled switch and the second voltage-controlled switch and a fourth node connected to a common voltage node of the second voltage-controlled switch and the output. Processing circuitry is configured to operate the sixth voltage-controlled switch to operate the voltage rectifier in a secondary mode.

In still another embodiment, a voltage rectifier includes an output. The output is connected parallel to: a first voltage-controlled switch connected in series with a second voltage-controlled switch; a third voltage-controlled switch connected in series with a fourth voltage-controlled switch; and a fifth voltage-controlled switch connected in series with a sixth voltage-controlled switch. The voltage rectifier includes an alternating current input having a first node connected between the first voltage-controlled switch and the second voltage-controlled switch and a second node connected between the fifth voltage-controlled switch and the sixth voltage-controlled switch. A first capacitor is connected in series between the first node and the connection point between the first voltage-controlled switch and the second voltage-controlled switch. A second capacitor is connected to the first node and between the third voltage-controlled switch and the fourth voltage-controlled switch. Processing circuitry is configured to operate the fourth voltage-controlled switch to operate the voltage rectifier in a primary mode or a secondary mode.

In still another embodiment, a method of rectifying an alternating current is provided. The method includes the operation of measuring an incoming voltage to a rectifier. The rectifier is operated in a full-wave rectifying mode in response to the measured incoming voltage exceeding a first threshold. The rectifier is operated in a voltage doubler rectifying mode in response to the measured incoming voltage falling below a second threshold.

In still another embodiment, a voltage rectifier includes a capacitor, a first voltage-controlled switch, a second voltage-controlled switch, and processing circuitry. The capacitor is coupled to a high-side lead of an input to the voltage rectifier. The first voltage-controlled switch is coupled to the capacitor and a low-side lead of the input, while the second voltage-controlled switch is coupled to the capacitor and a high-side lead of an output capacitor. The processing circuitry is configured to operate the turn-on timing and the turn-off timing of the first voltage-controlled switch and the second voltage-controlled switch. The first voltage-controlled switch is turned off while the second voltage-controlled switch is turned on, and the second voltage-controlled switch is turned on during at least half of a voltage cycle of an alternating current input signal.

BRIEF DESCRIPTION OF THE DRAWINGS

The disclosure will be readily understood by the following detailed description in conjunction with the accompanying drawings, wherein like reference numerals designate like elements.

Figure 1A:
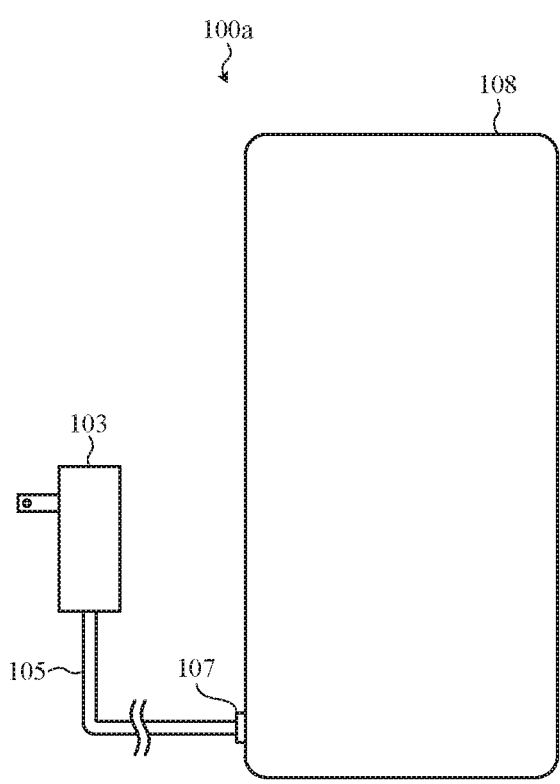
FIG. 1A depicts a wireless power transmission system, including a portable electronic device incorporating a rectifier.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

Embodiments described herein reference systems and methods for operating a power converter in a manner that efficiently converts one or more characteristics of electric power received from an electric power source (more generally, "power source") into a form usable by one or more components of an electronic device. The electronic device may be any stationary or portable electronic device including a desktop computer, a laptop computer, a tablet computer, a cellular telephone, a peripheral device, an accessory device, a wearable device, a vehicle or aeronautical control system, an industrial control system, an appliance, and so on.

Generally, a power converter, such as described herein, is configured to convert voltage from an unregulated or otherwise noisy voltage source (herein, "input voltage") into a regulated voltage level (herein, "output voltage") suitable for use by one or more electronic devices. For example, a power converter can be configured to regulate mains voltage (e.g., 90 VAC-265 VAC at 50-60 Hz) to a reference level such as 3.3 VDC, 5.0 VDC, 12 VDC, 50 VDC or any other suitable reference voltage. In some examples, the output of the power converter can be boosted to a higher level after being regulated to the reference level.

For simplicity and consistency of the description provided herein, many embodiments are presented and described with reference to power converters configured to reduce a high voltage alternating current (e.g., 265 VAC) to a relatively lower voltage direct current (e.g., 50 VDC). It may be appreciated, however, that the various techniques, circuit topologies, operations and/or methods presented with respect to this particular implementation can be equivalently applied to power converters configured to regulate power in another manner. For example, a power converter such as described herein can be suitably configured in any implementation-specific manner to convert an arbitrary input voltage to any selected or desired output voltage, whether such operation requires DC-to-DC conversion stages, AC-to-DC conversion stages, DC-to-AC conversion stages, AC-to-AC conversion stages, or any combination or sequence thereof.

As noted above, some embodiments described herein reference a power converter configured to regulate an alternating current input voltage to a particular direct current output voltage level. In these examples, the power converter includes at least one rectifier operated in a manner to efficiently rectify the input voltage to a rippled or steady direct current output voltage level. In many cases, the output of the rectifier is connected to additional power conditioning circuitry, such as a buck converter, a boost converter, a buck-boost converter, and/or a compensation network. The output of the rectifier can thereafter be connected to a load, such as an electronic device.

In some cases, a power converter includes a rectifier configured to regulate an alternating current input with a voltage which may be unpredictable or variable (e.g., 0.1 VAC-50 VAC). The rectifier may additionally or alternatively be connected to a load having a variable demand or impedance, but which requires the output voltage of the rectifier to have a voltage level with little or no variance, such as 3.3 VDC, 5.0 VDC, or 12 VDC (e.g., a constant or rippled direct current voltage).

For example, the power converter may be implemented in a portable electronic device configured to receive power wirelessly from a power transmitting source, such as a wireless charging mat. The portable electronic device may be configured to receive power wirelessly through a resonant inductive coupling, capacitive coupling, optical, acoustic, contact array, and so on. It should be understood that these and other wireless charging methods and systems may be employed within the scope of the present disclosure. For simplicity of description, the following embodiments are described in reference to resonant inductive systems and methods employing a receive coil in an electronic device coupled with a transmit coil in a wireless charging mat.

A wireless charging mat typically includes at least one transmit coil and an electronic device that can receive power from the wireless charging mat typically includes at least one receive coil. In operation, the transmit coil is energized with an alternating current; a time-varying magnetic flux field is produced by the transmit coil in response. The magnetic flux field induces an alternating current within the receive coil of the electronic device.

In such embodiments, the voltage induced at the receive coil of the electronic device may vary depending on the proximity between and the relative alignment of the receive coil with the transmit coil in the wireless charging mat. For example, if the receive coil is located away from the transmit coil, it may be subject to attenuated magnetic flux, resulting in a reduced induced voltage at the receive coil. Similarly, some orientations of the electronic device may reduce the induced voltage, for example due to interference introduced by objects, such as other components of the electronic device.

The power demands of the electronic device may also vary over time, which may result in a varying impedance across output leads of the power converter. For example, the demands of a processor or other circuitry may increase and decrease, placing a varying power demand on the power converter. The varying power demand results in a varying impedance across the output of the power converter, causing increases and decreases in the voltage output of the power converter from a desired constant output voltage.

Accordingly, the power converter may include a rectifier circuit configured to convert a variable alternating current input voltage to a substantially constant direct current output voltage (e.g., a rippled direct current voltage). In some examples, the rectifier circuit includes multiple operating modes to compensate for the varying input voltage and the varying impedance of the connected load. A first operating mode may be formed from a full-wave rectifying sub-circuit. A second operating mode may be formed from an additional rectifying sub-circuit, such as a voltage doubler rectifying circuit. A voltage-controlled switch within the rectifier circuit may controllably adjust the operating mode (e.g., based on the input voltage level, a desired output voltage and/or current, and so on).

In these examples, the rectifier circuit may be coupled to processing circuitry which is configured to monitor a power condition associated with the power converter (e.g., an input voltage level, an output voltage level, an impedance at the output, etc.) and affect the operation of the rectifier circuit based on the condition. For example, the processing circuitry may monitor an input voltage level. If the input voltage is above a first threshold level, the processing circuitry may cause the rectifier circuit to be operated in a full-wave rectifying mode. In the full-wave rectifying mode the current delivered to a connected load (e.g., a battery or other component of the electronic device) may be higher than in other operating modes. However, if the input voltage falls below a second threshold level (e.g., the same or a lower level from the first threshold level), the processing circuitry may cause the rectifier circuit to be operated in a voltage doubler rectifying mode. In the voltage doubler rectifying mode the output voltage may be double the full-wave rectifying mode to compensate for the lower input voltage, while the current delivered to a connected load may be reduced.

In other examples, the rectifier circuit includes a boost rectifier topology. In a boost rectifier topology, the rectifier circuit can variably adjust a direct current output voltage up to double the peak input alternating current voltage. In these examples, the boost rectifier circuit may include two voltage-controlled switches connected similar to a voltage doubler configuration. The output voltage of the boost rectifier circuit may be controlled as a function of the operation timing of the voltage-controlled switches. The output voltage may thus be controllably adjusted to boost levels up to double the peak input voltage.

In these examples, the boost rectifier circuit may be coupled to processing circuitry which is configured to monitor a power condition associated with the power converter (e.g., an input voltage level, an output voltage level, an impedance at the output, etc.) and affect the operation of the boost rectifier circuit based on the condition. For example, the processing circuitry may monitor an output voltage level. If the output voltage level drops (e.g., due to an increased impedance across the output terminals), the processing circuitry may change the turn-on and turn-off timing of the voltage-controlled switches to boost the output voltage from the boost rectifier circuit.

These and other embodiments are discussed below with reference to FIGS. 1A-7. However, those skilled in the art will readily appreciate that the detailed description given herein with respect to these Figures is for explanatory purposes only and should not be construed as limiting.

Figure 1B:
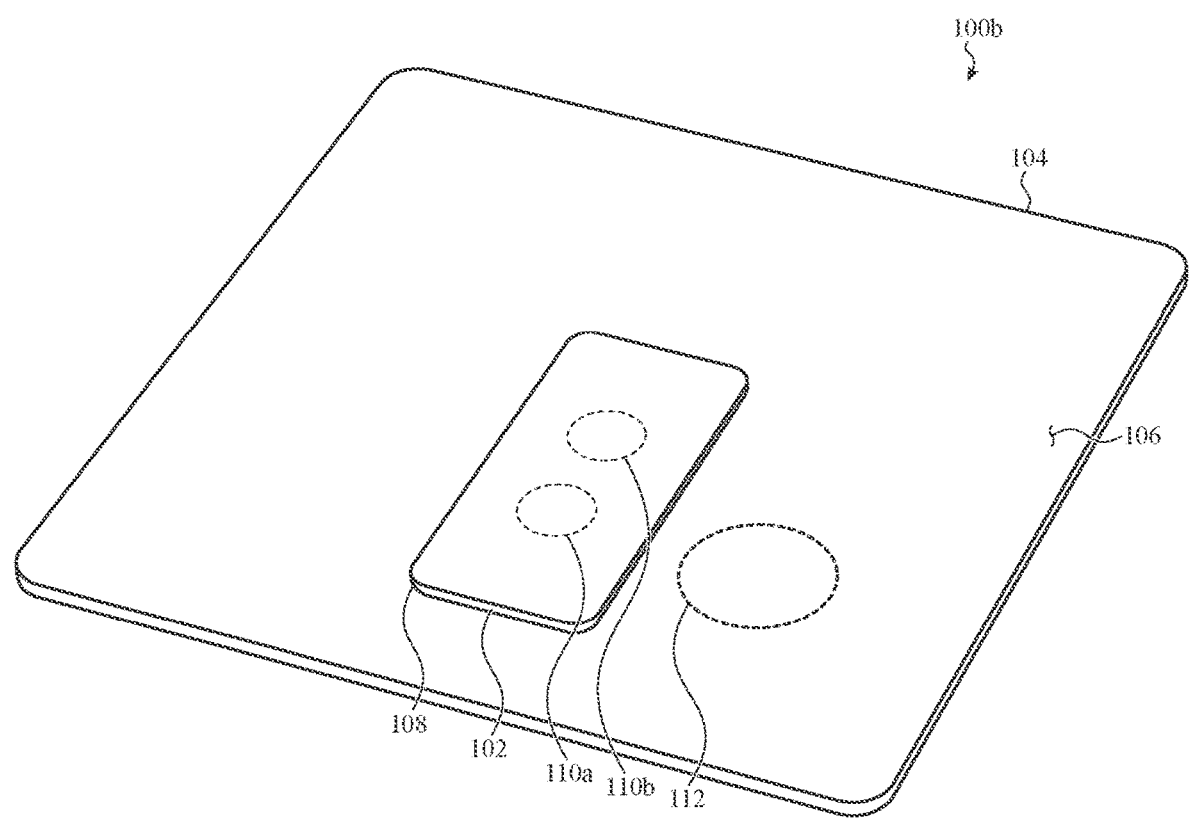
FIG. 1B depicts a wireless power transmission system, including a portable electronic device incorporating a rectifier.
Figure 1C:
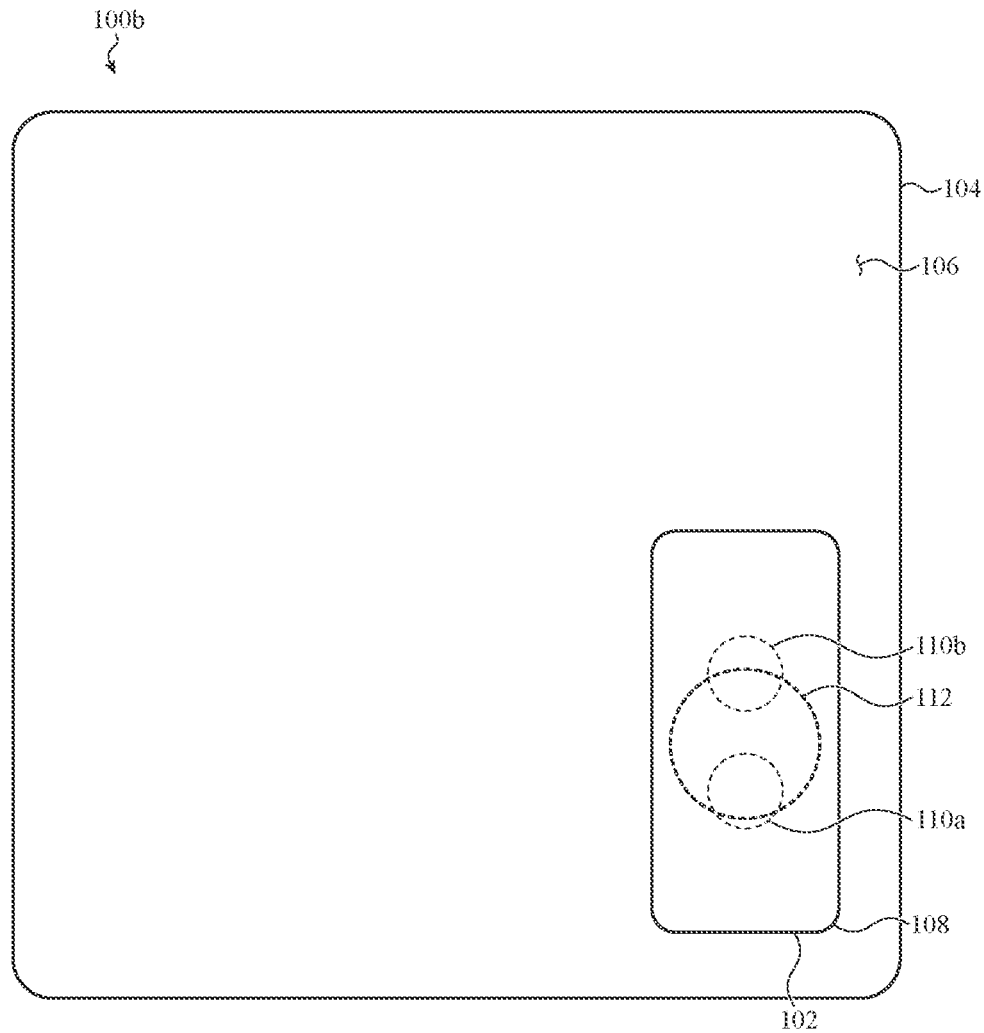
FIG. 1C depicts a wireless power transmission system, including a portable electronic device incorporating a rectifier.

Generally and broadly, FIGS. 1A-1C reference various example electronic devices that may incorporate, or may be associated with or coupled to, one or more power converters such as described herein. It will be appreciated, however, that the depicted examples are not exhaustive; the various embodiments described with reference to FIGS. 1A-1C may be modified or combined in any number of suitable or implementation-specific ways.

For example, FIG. 1A depicts an electronic device coupled to a stand-alone power converter configured to change one or more characteristics of power received from a power source into a form usable by the electronic device.

More particularly, the electronic device 100a includes a housing 108 to retain, support, and/or enclose various components of the electronic device 100a such as a rechargeable battery (not shown). The electronic device 100a can also include a processor, memory, power converter and/or battery, network connections, sensors, input/output ports, acoustic elements, haptic elements, digital and/or analog circuits for performing and/or coordinating tasks of the electronic device 100a, and so on. For simplicity of illustration, the electronic device 100a is depicted in FIG. 1A without many of these elements, each of which may be included, partially and/or entirely, within the housing 108 and may be operationally or functionally associated with the internal battery.

In one example, the internal battery of the electronic device 100a can be recharged by physically connecting the electronic device 100a to a power converter 103. More specifically, a power cable 105 can provide a direct electrical connection between the power converter 103 and the electronic device 100a. In some cases, the power cable 105 is connected to the electronic device 100a via a connector 107.

In these embodiments, the power converter 103 can be configured to accept power at mains voltage and output that power in a form usable by one or more circuits configured to facilitate recharging of the internal battery. In one particular example, the power converter 103 accepts 120 VAC as input and outputs 5 VDC, which can be accepted by the electronic device 100a and used to recharge the internal battery. More broadly, the power converter 103 can be configured to accept high-voltage AC and can be configured to output a lower-voltage DC.

In another example, the power converter 103 can be configured to accept power at mains voltage and output that power in a form that is subsequently converted again by the electronic device 100a prior to being used to charge the internal battery. More specifically, in this example, the power converter 103 can be configured to accept 120 VAC as input and can be configured to output 50 VDC. In these examples, the power converter 103 may also include an inverter (not shown). Thereafter, the electronic device 100a can accept 50 VDC and further convert, by a second power converter within the electronic device 100a, to 5 VDC.

More broadly, the power converter 103 can be configured in this example to accept high-voltage AC and can be configured to output lower-voltage DC. In addition, the second power converter (which can be enclosed within the housing 108) can be configured to accept relatively high-voltage DC and can be configured to output low-voltage DC.

It may be appreciated that the limited examples provided above are not exhaustive. For example, the power converter 103 may be configured to perform an AC-to-AC or AC-to-DC conversion to different voltages than those provided above. Similarly, a power converter enclosed within the housing of the electronic device 100a may be appropriately configured to provide AC-to-AC, AC-to-DC, DC-to-AC, or DC-to-DC conversion.

Furthermore, although illustrated as a cellular phone, it may be appreciated that the electronic device 100a can be another suitable electronic device that is either stationary or mobile, taking a larger or smaller form factor than illustrated. For example, in certain embodiments, the electronic device 100a can be a laptop computer, a tablet computer, a cellular phone, a wearable device, a health monitoring device, a home or building automation device, a home or building appliance, a craft or vehicle entertainment, control, power, and/or information system, a navigation device, and so on.

In other embodiments, a power converter can be implemented within a wireless power transfer system 100b. For example, FIGS. 1B and 1C depict a wireless charging mat 104, configured to wirelessly transfer power to an electronic device 102. An electronic device 102 includes a housing 108 enclosing one or more power receivers configured to receive an alternating current input voltage from the wireless charging mat 104 through a resonant inductive coupling, capacitive coupling, optical, acoustic, contact array, or similar system or method. For simplicity, the following embodiments are described in reference to resonant inductive systems and methods employing one or more receive coils 110a, 110b in the electronic device 102. The receive coils 110a, 110b are configured to interact with a transmit coil 112 in the charging mat 104 to receive power, and may further power components of the electronic device 102 and/or recharge a battery of the electronic device 102.

A receive coil 110a may be any inductive coil suitable for forming an inductive coupling with a nearby transmit coil 112. The receive coil 110a may be configured to respond to the presence of a magnetic flux field (e.g., a field generated by a transmit coil 112), by which the field may induce a current in the receive coil 110a. Generally, the induced current is an alternating current, and the electronic device 102 includes a power converter with a rectifier configured to convert an alternating current input voltage to a direct current output voltage.

The charging mat 104 includes a housing to enclose electronic, mechanical, and/or structural components. For example, the housing may enclose one or more inductive transmit coils 112. Generally, a wireless charging mat 104 is configured to transfer power to an electronic device 102 on or near a charging surface 106 without use of wires. The charging mat 104 may draw power from a power source, such as a wall receptacle, condition the power, and transmit the conditioned power to the electronic device 102 using the transmit coil 112. The transmit coil 112 may be energized with an alternating current, which may produce a magnetic flux field in response. If an electronic device 102 that incorporates a corresponding receive coil 110a, 110b is brought within the flux field, a current is induced within the receive coil 110a, 110b.

In many cases, the voltage of the power induced in the receive coil 110a, 110b by the transmit coil 112 may vary. For example, the voltage may decrease due to a reduced coupling between a receive coil 110b in the electronic device 102 and the transmit coil 112 in the wireless charging mat 104. For example, as depicted in FIG. 1C, the electronic device 102 includes a first receive coil 110a and a second receive coil 110b. Each of the receive coils 110a, 110b is positioned over a corresponding transmit coil 112. When the transmit coil is energized, it produces a magnetic flux field. The first receive coil 110a overlaps the transmit coil 112 more than the second receive coil 110b does, and may accordingly have a stronger response to the magnetic flux field, such as a higher induced voltage. The second receive coil 110b may have a weaker response to the magnetic flux field, such as a lower induced voltage.

A power converter (such as the power converter depicted below with respect to FIG. 2.) within the electronic device 102 includes a rectifier circuit configured to convert an alternating current input voltage to a substantially constant direct current output voltage (e.g., a rippled direct current voltage). In these examples, the rectifier circuit is configured to adapt to conditions which affect its output voltage, such as a reduced input voltage (e.g., due to a reduced coupling between a receive coil 110b and a transmit coil 112) or a varying impedance across the output of the power converter (e.g., due to a load with varying power demands). In some examples, a rectifier circuit includes at least two operating modes, such as a full-wave rectifying mode and a voltage doubler rectifying mode. A voltage-controlled switch coupled with processing circuitry may controllably adjust the operating mode of the rectifier circuit (e.g., based on the input voltage level, a desired output voltage and/or current, and so on). Example embodiments are further described below with respect to FIGS. 3-6.

In other examples, the rectifier circuit includes a boost rectifier topology. The boost rectifier includes two voltage-controlled switches, which may be dynamically controlled to output a boosted voltage up to double the peak input alternating current voltage. The output voltage of the boost rectifier circuit may be controlled as a function of the operation timing of the voltage-controlled switches. Example embodiments are further described below with respect to FIGS. 7-8.

The foregoing embodiments depicted in FIGS. 1A-1C and the various alternatives thereof and variations thereto are presented, generally, for purposes of explanation, and to facilitate an understanding of various possible electronic devices or accessory devices that can incorporate, or be otherwise coupled to, one or more power converters such as described herein. More specifically, FIGS. 1A-1C are presented to illustrate that a power converter such as described herein can be incorporated, either entirely or partially, into the housing of an electronic device, into a separate power accessory that couples to an electronic device via a cable, into a separate power accessory that provides wireless power to one or more electronic devices, and so on.

Figure 2:
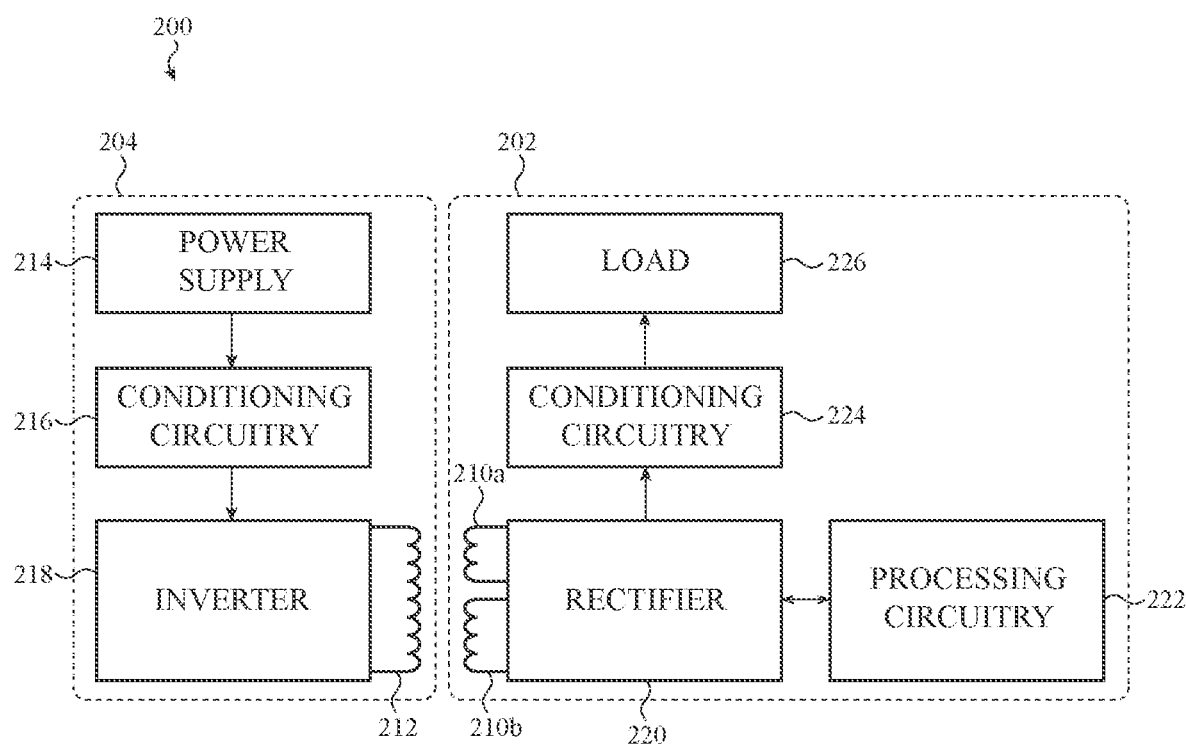
FIG. 2 depicts a simplified schematic view of components of a wireless charging system.

FIG. 2 depicts a simplified schematic view of components of a wireless charging system 200. The wireless charging system 200 includes a wireless charging mat 204 configured to transmit power to an electronic device 202. The wireless charging mat 204 includes a power supply 214, which may provide alternating current power. The alternating current power supply 214 can deliver alternating current with any suitable amplitude or frequency. In one example, the alternating current power supply 214 is connected to the output of a step-up converter (not shown) which can be configured to accept variable mains voltage as input (e.g., 110 VAC-250 VAC). In this case, the step-up converter may be configured to increase mains voltage to 400 VAC, or any other suitable voltage level that is reliably higher than the maximum expected mains voltage level (e.g., 250 VAC).

Incoming power may pass from the power supply 214 through conditioning circuitry 216. The conditioning circuitry 216 may alter the power according to the requirements for output at an inductive transmit coil 212. For example, the conditioning circuitry 216 may alter the voltage, current, frequency, phase, and/or other aspects of the incoming power in order to arrive at a desired output for the transmit coil 212. The transmit coil 212 may be configured to wirelessly transfer power to one or more receive coils 210a, 210b via resonant inductive power transfer. The transmit coil 212 may be energized with an alternating current signal received from the conditioning circuitry 216 to induce an alternating current in a coupled receive coil 210a, 210b. The conditioning circuitry 216 may include a number of other components, such as a rectifier, a buck converter, boost converter, filters, boost/buck converter, and so forth, which have been omitted from FIG. 2 for clarity. In some cases, the incoming power from the power supply 214 may be a direct current. In such cases, the conditioning circuitry 216 may additionally convert the direct current to an appropriate alternating current for the transmit coil 212.

In some embodiments, elements of the power supply 214 and/or conditioning circuitry 216 may form part of the wireless charging mat 204. In other embodiments, one or both of the power supply 214 and conditioning circuitry 216 may be separate from the wireless charging mat 204.

The electronic device 202 may receive power wirelessly via an induced current in one or more receive coils 210a, 210b. For example, the transmit coil 212 in the wireless charging mat 204 may be energized with an alternating current, causing the transmit coil 212 to generate a magnetic flux field. The magnetic flux field may in turn induce an alternating current in the receive coils 210a, 210b of the electronic device 202. The induced current in each receive coil 210a, 210b has a voltage, which voltage may vary depending on the coupling between each receive coil 210a, 210b and the transmit coil 212 in the wireless charging mat 204. The induced current may pass from the receive coils 210a, 210b through a power converter, including a rectifier circuit 220.

The rectifier circuit 220 is configured to convert an alternating current input voltage to a substantially constant direct current output voltage (e.g., a rippled direct current voltage). The power converter may include additional conditioning circuitry 224 to further alter the power according to the requirements for output to the load 226. For example, the conditioning circuitry 224 may alter the voltage, current, frequency, phase, and/or other aspects of the incoming power in order to arrive at a desired output to the load 226. The conditioning circuitry 224 may include a number of other components, such as a buck converter, boost converter, filters, boost/buck converter, a compensation network, and so forth, which have been omitted from FIG. 2 for clarity. In other embodiments the rectifier circuit 220 may be directly coupled to the load 226 and/or the one or more receive coils 210a, 210b.

The conditioning circuitry 224 may be further coupled to a load 226. The load 226 may be any appropriate load, and may require a substantially constant direct current input voltage. In many embodiments, the load 226 may have an impedance which varies over time. For example, the load 226 may include components of the electronic device 202, such as processing circuits, battery charging components, a display, and so on. These components may consume power at varying levels and times, altering the power requirements and, consequently, an impedance across output terminals of the power converter.

Accordingly, the rectifier circuit 220 may be configured to compensate for the varying input voltage levels and/or output impedance noted above. In some embodiments, the rectifier circuit 220 includes at least two operating modes to compensate for the varying input voltage and/or impedance. In many cases, a first operating mode may be formed from a full-wave rectifying sub-circuit. A second operating mode may be formed from an additional rectifying sub-circuit, such as a voltage doubler rectifying circuit. One or more switches within the rectifier circuit 220 may controllably switch the operating mode.

In these embodiments, the rectifier circuit 220 may be coupled to processing circuitry 222. The processing circuitry 222 may control the operation of one or more switches within the rectifier circuit 220, including to cause the rectifier circuit 220 to switch between modes. While the processing circuitry 222 is depicted outside the line of power transmission to the load 226, in other embodiments the processing circuitry 222 may be within the power transmission line. However implemented, the processing circuitry 222 is configured to monitor a condition of the input voltage and affect the operation of the rectifier circuit 220 based on the condition.

For example, the processing circuitry 222 may monitor an input voltage level received from one or more receive coils 210a, 210b. If the input voltage level is above a first threshold, the processing circuitry 222 may cause the rectifier circuit 220 to be operated in a full-wave rectifying mode. However, if the input voltage falls below a second threshold level (e.g., the same or a different level from the first threshold), the processing circuitry 222 may cause the rectifier circuit 220 to be operated in a voltage doubler rectifying mode. In the voltage doubler rectifying mode the output voltage to the load 226 may be doubled in order to compensate for the reduced input voltage level.

In other embodiments, the rectifier circuit 220 includes a boost rectifier topology. In a boost rectifier topology, the rectifier circuit 220 can variably adjust a direct current output voltage up to double the peak input alternating current voltage. The rectifier circuit 220 may include two voltage-controlled switches, which may be dynamically controlled to output a boosted voltage up to double the peak input alternating current voltage. The output voltage of the boost rectifier circuit may be controlled as a function of the operation timing of the voltage-controlled switches.

In these embodiments, the rectifier circuit 220 may be coupled to processing circuitry 222. The processing circuitry 222 is configured to monitor a power condition associated with the power converter (e.g., an input voltage level, an output voltage level, or an impedance at the output) and affect the operation of the rectifier circuit 220

For example, the processing circuitry 222 may monitor an output voltage level to the load 226. If the impedance of the load 226 increases, the output voltage level to the load 226 may also drop. In response to the detected voltage drop, the processing circuitry 222 may alter the turn-on and turn-off timing of the voltage-controlled switches to boost the output voltage from the boost rectifier circuit.

The processing circuitry 222 may include one or more computer processors or microcontrollers that are configured to perform, interrupt, or coordinate operations in response to computer-readable instructions. Additionally or alternatively, the processing circuitry 222 may include other processors including application specific integrated chips and other microcontroller devices.

In some embodiments, the processing circuitry 222 may further be operatively connected to computer memory via an electronic bus or bridge. The memory may include a variety of types of non-transitory computer-readable storage media, including, for example, read access memory, read-only memory, erasable programmable memory, or flash memory. The memory is configured to store computer-readable instructions, sensor values, and other persistent software elements.

In this example, the processing circuitry 222 may be operable to read computer-readable instructions stored on the memory. The computer-readable instructions may adapt the processing circuitry 222 to perform the operations or functions described herein, such as switching the operating mode of the rectifier circuit 220. In some embodiments, the processing circuitry 222 may affect the operations of other components, such as the conditioning circuitry 224. The computer-readable instructions may be provided as a computer-program product, software application, or the like.

Generally and broadly, FIGS. 3-8 reference certain example rectifier circuits that can be implemented within a power converter such as described herein. It will be appreciated, however, that the depicted examples are not exhaustive; the various embodiments depicted and described with reference to FIGS. 3-8 may be implemented, interconnected, or otherwise modified in any number of suitable or appropriate ways.

Figure 3:
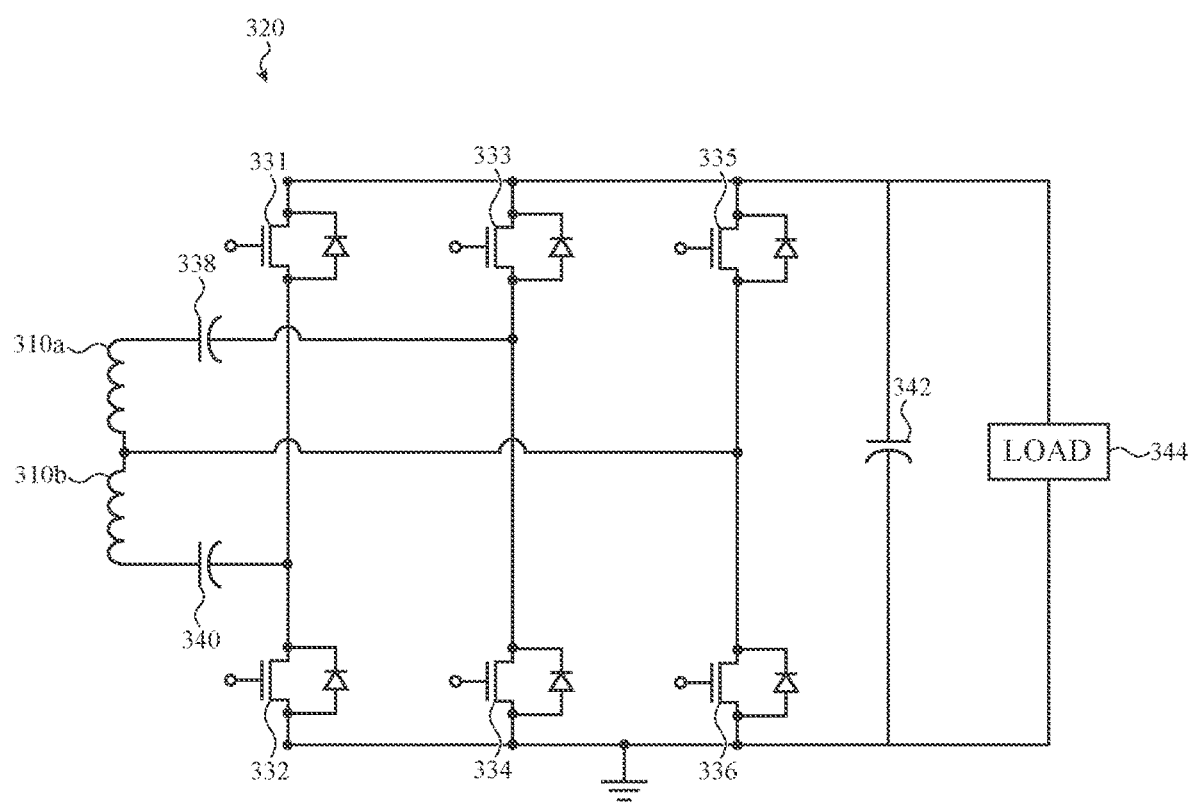
FIG. 3 depicts a simplified schematic diagram of an example rectifier of a power converter.

For example, FIG. 3 depicts a simplified schematic diagram of an example rectifier of a power converter such as described herein. The rectifier circuit 320 receives input power from two alternating current power sources 310a, 310b and rectifies the received current into a direct current output voltage having a substantially constant voltage (e.g., a rippled direct current voltage). The alternating current power sources 310a, 310b may be inductive receive coils such as depicted above with respect to FIGS. 1A-2, while in other embodiments the power sources 310a, 310b may receive power through another source. In some embodiments each alternating current power source 310a, 310b is a separate receive coil, while in other embodiments the power sources 310a, 310b may represent portions of a center-tapped receive coil.

The rectifier circuit 320 includes a set of voltage-controlled switches 331-336. The set may include six voltage-controlled switches 331-336, and a conduction state of each voltage-controlled switch 331-336 may be toggled between an on-state and an off-state in order to rectify the input voltage. The voltage-controlled switches 331-336 are connected in parallel with the load 344 in pairs. A first voltage-controlled switch 331 and second voltage-controlled switch 332 are connected in series, with the pair being connected in parallel to the load 344. A third voltage-controlled switch 333 and fourth voltage-controlled switch 334 are connected in series, with the pair being connected in parallel to the load 344. A fifth voltage-controlled switch 335 and sixth voltage-controlled switch 336 are connected in series, with the pair being connected in parallel to the load 344.

The load 344 may be any arbitrary load configured to receive the rectified output voltage of the rectifier circuit 320 (e.g., the conditioning circuitry 224 and/or the load 226 as depicted in FIG. 2). In many cases, the output of the rectifier circuit 320 may be a rippled direct current voltage. An output capacitor 342 can be added in parallel to the load 344 to further smooth the rippled direct current waveform. The output capacitor 342 functions as a low-pass filter.

The alternating current power sources 310a, 310b are coupled to the set of voltage-controlled switches of the rectifier circuit 320. A high-side lead of a first alternating current power source 310a is coupled to a low-side lead of the third voltage-controlled switch 333 and a high-side lead of the fourth voltage-controlled switch 334. A low-side lead of the first alternating current power source 310a is coupled to a low-side lead of the fifth voltage-controlled switch 335 and a high-side lead of the sixth voltage-controlled switch 336. In some embodiments, a capacitor 338 may be connected in series between the high-side lead of the first alternating current power source 310a and the low-side lead of the third voltage-controlled switch 333.

A high-side lead of a second alternating current power source 310b is coupled to a low-side lead of the fifth voltage-controlled switch 335 and a high-side lead of the sixth voltage-controlled switch 336. A low-side lead of the second alternating current power source 310b is coupled to a low-side lead of the first voltage-controlled switch 331 and a high-side lead of the second voltage-controlled switch 332. In some embodiments, a capacitor 340 may be connected in series between the low-side lead of the second alternating current power source 310b and the low-side lead of the first voltage-controlled switch 331.

The set of voltage-controlled switches of the rectifier circuit 320 may be operated in a full-wave rectifier mode and a voltage doubler mode. The sixth voltage-controlled switch 336 may controllably switch the rectifier circuit 320 between modes. For example, the sixth voltage-controlled switch 336 may be operably coupled to processing circuitry (e.g., processing circuitry 222 such as depicted in FIG. 2). The processing circuitry may monitor a condition of the power converter and operate the sixth voltage-controlled switch 336 according to the condition.

For example, the processing circuitry may monitor a voltage across one or both alternating current power sources 310a, 310b. If the voltage across one or both alternating current power sources 310a, 310b exceeds a threshold (e.g., due to strong coupling with a transmit coil), the processing circuit may operate the sixth voltage-controlled switch 336 in a full-wave rectifying mode. In the full-wave rectifying mode, the first alternating current power source 310a may pass current through a full-wave bridge rectifier circuit formed with the third voltage-controlled switch 333, the fourth voltage-controlled switch 334, the fifth voltage-controlled switch 335, and the sixth voltage-controlled switch 336.

In this example, during a positive voltage half-cycle of the first alternating current power source 310a, the processing circuitry causes the third voltage-controlled switch 333 and the sixth voltage-controlled switch 336 to be closed while the fourth voltage-controlled switch 334 and the fifth voltage-controlled switch 335 are opened. This passes a positive-voltage current to the high-side lead of the output capacitor 342 and the load 344. During a negative voltage half-cycle of the first alternating current power source 310a, the processing circuitry causes the fourth voltage-controlled switch 334 and the fifth voltage-controlled switch 335 to be closed while the third voltage-controlled switch 333 and the sixth voltage-controlled switch 336 are opened. This passes a negative-voltage current to the low-side lead of the output capacitor 342 and the load 344. In this manner, the first alternating current power source 310a is rectified during its full cycle.

In the full-wave rectifying mode, the second alternating current power source 310b may simultaneously pass current through a full-wave bridge rectifier circuit formed with the first voltage-controlled switch 331, the second voltage-controlled switch 332, the fifth voltage-controlled switch 335, and the sixth voltage-controlled switch 336.

In this example, during a positive voltage half-cycle of the second alternating current power source 310b, the processing circuitry causes the second voltage-controlled switch 332 and the fifth voltage-controlled switch 335 to be closed while the sixth voltage-controlled switch 336 and the first voltage-controlled switch 331 are opened. This passes a positive-voltage current to the high-side lead of the output capacitor 342 and the load 344. During a negative voltage half-cycle of the second alternating current power source 310b, the processing circuitry causes the first voltage-controlled switch 331 and the sixth voltage-controlled switch 336 to be closed while the second voltage-controlled switch 332 and the fifth voltage-controlled switch 335 are opened. This passes a negative-voltage current to the low-side lead of the output capacitor 342 and the load 344. In this manner, the second alternating current power source 310a is rectified during its full cycle.

If the voltage across one or both alternating current power sources 310a, 310b falls below a threshold (e.g., due to weak coupling with a transmit coil), the processing circuit may operate the sixth voltage-controlled switch 336 in a voltage doubler rectifying mode. In the voltage doubler rectifying mode, the sixth voltage-controlled switch 336 is pulled to ground and the first alternating current power source 310a may pass current through a voltage doubler rectifier circuit formed with the third voltage-controlled switch 333 and the fourth voltage-controlled switch 334.

In this example, during a negative voltage half-cycle of the first alternating current power source 310a, the processing circuitry causes the third voltage-controlled switch 333 to be opened while the fourth voltage-controlled switch 334 is closed. This places the capacitor 338 in parallel with the first alternating current power source 310a, charging the capacitor 338 with a negative voltage. During a positive voltage half-cycle of the first alternating current power source 310a, the processing circuitry causes the fourth voltage-controlled switch 334 to be opened while the third voltage-controlled switch 333 is closed. This places the capacitor 338 in series with the first alternating current power source 310a both of which are in parallel with the output capacitor 342. This charges the output capacitor 342 with the combined voltage of the first alternating current power source 310a and the capacitor 338, doubling the output voltage of the rectifier circuit 320.

In the voltage doubler rectifying mode, the second alternating current power source 310b may simultaneously pass current through a voltage doubler rectifier circuit formed with the first voltage-controlled switch 331 and the second voltage-controlled switch 332.

Continuing the example, during a negative voltage half-cycle of the second alternating current power source 310b, the processing circuitry causes the first voltage-controlled switch 331 to be opened while the second voltage-controlled switch 332 is closed. This places the capacitor 340 in parallel with the first alternating current power source 310a, charging the capacitor 340 with a negative voltage. During a positive voltage half-cycle of the second alternating current power source 310b, the processing circuitry causes the second voltage-controlled switch 332 to be opened while the first voltage-controlled switch 331 is closed. This places the capacitor 340 in series with the second alternating current power source 310b, both of which are in parallel with the output capacitor 342. This charges the output capacitor 342 with the combined voltage of the second alternating current power source 310b and the capacitor 340, doubling the output voltage of the rectifier circuit 320.

Each voltage-controlled switch 331-336 may be a suitable switch, such as a MOSFET. In some embodiments, the voltage-controlled switches 331-336 can each be associated with a diode. The diodes are placed across the respective source and drain of the voltage-controlled switches 331-336 such that one diode is associated with each voltage-controlled switch. In some embodiments, the diodes can be discrete and separate elements from the voltage-controlled switches 331-336, although this is not required. For example, in one embodiment the diodes are implemented as body diodes within the voltage-controlled switches 331-336. In other examples, the diodes can be implemented as external diodes, such as Schottky diodes. The diodes of the voltage-controlled switches 331-336 can be used as supplemental current paths during the operation of the rectifier circuit 320. More specifically, in certain embodiments, the rectifier circuit 320 may briefly pause between switching between the separate electrical paths of each rectifier sub-circuit (e.g., between positive and negative half-cycles of a full-wave rectifier sub-circuit). This "dead time" between rectifier cycles may be included in order to prevent "shoot-through" current which may occur if the voltage-controlled switches of the distinct rectifier half-cycles are in the on-state at the same time. During the dead time between rectifier half-cycles, current within a receive coil 310a, 310b may be conducted through one or more of the diodes, thereby preventing said current from causing damage to one or more of the voltage-controlled switches 331-336 during the dead time period. As may be appreciated, the voltage across an inverter diode may increase rapidly when said diode begins conducting current during a dead time period. The forward voltage of the conducting diodes may be observed as a voltage spike when measured across a receive coil 310a, 310b.

Figure 4:
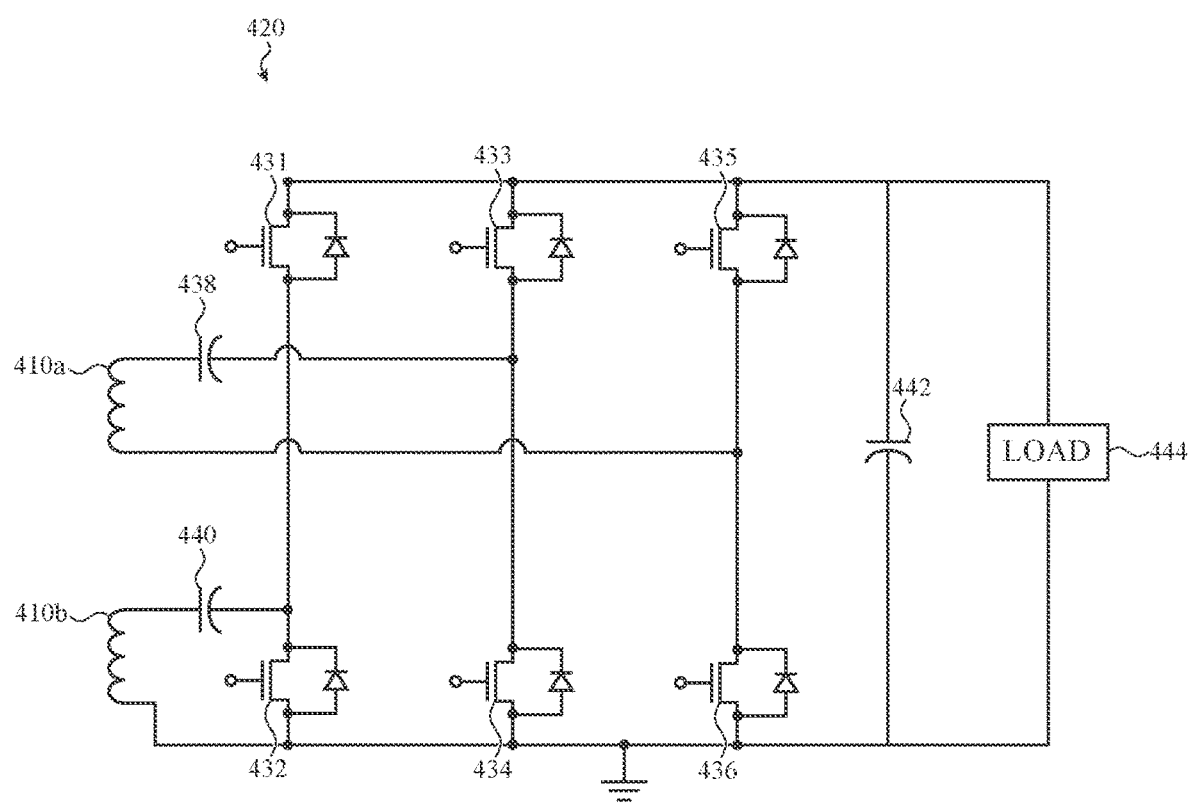
FIG. 4 depicts a simplified schematic diagram of another example rectifier of a power converter.

FIG. 4 depicts a simplified schematic diagram of an example rectifier of a power converter such as described herein. The rectifier circuit 420 receives input power from two alternating current power sources 410a, 410b and rectifies the received current into a direct current output voltage having a substantially constant voltage (e.g., a rippled direct current voltage). The alternating current power sources 410a, 410b may be inductive receive coils such as depicted above with respect to FIGS. 1A-2, while in other embodiments the rectifier power sources 410a, 410b may receive power through another source.

The rectifier circuit 420 includes a set of voltage-controlled switches 431-436. The set may include six voltage-controlled switches 431-436, and a conduction state of each voltage-controlled switch 431-436 may be toggled between an on-state and an off-state in order to rectify the input voltage. The voltage-controlled switches 431-436 are connected in parallel with the load 444 in pairs. A first voltage-controlled switch 431 and second voltage-controlled switch 432 are connected in series, with the pair being connected in parallel to the load 444. A third voltage-controlled switch 433 and fourth voltage-controlled switch 434 are connected in series, with the pair being connected in parallel to the load 444. A fifth voltage-controlled switch 435 and sixth voltage-controlled switch 436 are connected in series, with the pair being connected in parallel to the load 444.

The load 444 may be any arbitrary load configured to receive the rectified output voltage of the rectifier circuit 420 (e.g., the conditioning circuitry 224 and/or the load 226 as depicted in FIG. 2). In many cases, the output of the rectifier circuit 420 may be a rippled direct current voltage. An output capacitor 442 can be added in parallel to the load 444 to further smooth the rippled direct current waveform. The output capacitor 442 functions as a low-pass filter.

The alternating current power sources 410a, 410b are coupled to the set of voltage-controlled switches of the rectifier circuit 420. A high-side lead of a first alternating current power source 410a is coupled to a low-side lead of the third voltage-controlled switch 433 and a high-side lead of the fourth voltage-controlled switch 434. A low-side lead of the first alternating current power source 410a is coupled to a low-side lead of the fifth voltage-controlled switch 435 and a high-side lead of the sixth voltage-controlled switch 436. In some embodiments, a capacitor 438 may be connected in series between the high-side lead of the first alternating current power source 410a and the low-side lead of the third voltage-controlled switch 433.

A high-side lead of a second alternating current power source 410b is coupled to a low-side lead of the first voltage-controlled switch 431 and a high-side lead of the second voltage-controlled switch 432. A low-side lead of the second alternating current power source 410b is coupled to a low-side lead of the second voltage-controlled switch 432 (e.g., a common ground reference of the rectifier circuit 420). In some embodiments, a capacitor 440 may be connected in series between the high-side lead of the second alternating current power source 410b and the low-side lead of the first voltage-controlled switch 431.

The first alternating current power source 410a may be operated in a full-wave rectifier mode and a voltage doubler mode, while the second alternating current power source 410b may be operated in a voltage doubler mode (e.g., by passing current through a voltage doubler rectifying circuit formed with the first voltage-controlled switch 431 and second voltage-controlled switch 432). The sixth voltage-controlled switch 436 may controllably switch the rectifier circuit 420 between modes for the first alternating current power source 410a. For example, the sixth voltage-controlled switch 436 may be operably coupled to processing circuitry (e.g., processing circuitry 222 such as depicted in FIG. 2). The processing circuitry may monitor a condition of the power converter and operate the sixth voltage-controlled switch 436 according to the condition.

For example, the processing circuitry may monitor a voltage across the first alternating current power source 410a. If the voltage across the first alternating current power source 410a exceeds a threshold (e.g., due to strong coupling with a transmit coil), the processing circuit may operate the sixth voltage-controlled switch 436 in a full-wave rectifying mode. In the full-wave rectifying mode, the first alternating current power source 410a may pass current through a full-wave bridge rectifier circuit formed with the third voltage-controlled switch 433, the fourth voltage-controlled switch 434, the fifth voltage-controlled switch 435, and the sixth voltage-controlled switch 436.

If the voltage across the first alternating current power source 410a falls below a threshold (e.g., due to weak coupling with a transmit coil), the processing circuit may operate the sixth voltage-controlled switch 436 in a voltage doubler rectifying mode. In the voltage doubler rectifying mode, the sixth voltage-controlled switch 436 is pulled to ground and the first alternating current power source 410a may pass current through a voltage doubler rectifier circuit formed with the third voltage-controlled switch 433 and the fourth voltage-controlled switch 434.

Similar to the example rectifier circuit of FIG. 3, each voltage-controlled switch 431-436 may be a suitable switch, such as a MOSFET. In some embodiments, the voltage-controlled switches 431-436 can each be associated with a diode. The diodes may be discrete and separate elements from the voltage-controlled switches, while in other embodiments the diodes are implemented as body diodes within the voltage-controlled switches 431-436.

Figure 5:
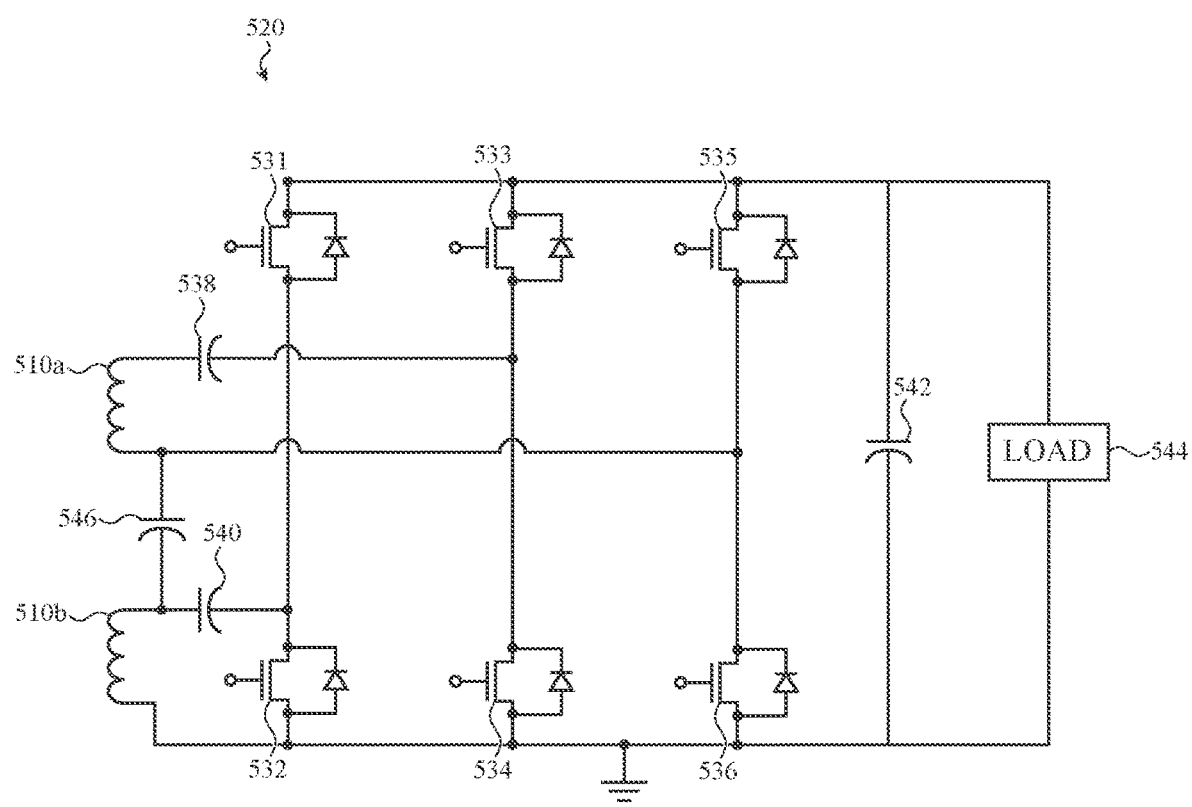
FIG. 5 depicts a simplified schematic diagram of another example rectifier of a power converter.

FIG. 5 depicts a simplified schematic diagram of an example rectifier of a power converter such as described herein. The rectifier circuit 520 receives input power from two alternating current power sources 510a, 510b and rectifies the received current into a direct current output voltage having a substantially constant voltage (e.g., a rippled direct current voltage). The alternating current power sources 510a, 510b may be inductive receive coils such as depicted above with respect to FIGS. 1A-2, while in other embodiments the rectifier power sources 510a, 510b may receive power through another source.

The rectifier circuit 520 includes a set of voltage-controlled switches 531-536. The set may include six voltage-controlled switches 531-536, and a conduction state of each voltage-controlled switch 531-536 may be toggled between an on-state and an off-state in order to rectify the input voltage. The voltage-controlled switches 531-536 are connected in parallel with the load 544 in pairs. A first voltage-controlled switch 531 and second voltage-controlled switch 532 are connected in series, with the pair being connected in parallel to the load 544. A third voltage-controlled switch 533 and fourth voltage-controlled switch 534 are connected in series, with the pair being connected in parallel to the load 544. A fifth voltage-controlled switch 535 and sixth voltage-controlled switch 536 are connected in series, with the pair being connected in parallel to the load 544.

The load 544 may be any arbitrary load configured to receive the rectified output voltage of the rectifier circuit 520 (e.g., the conditioning circuitry 224 and/or the load 226 as depicted in FIG. 2). In many cases, the output of the rectifier circuit 520 may be a rippled direct current voltage. An output capacitor 542 can be added in parallel to the load 544 to further smooth the rippled direct current waveform. The output capacitor 542 functions as a low-pass filter.

The alternating current power sources 510a, 510b are coupled to the set of voltage-controlled switches of the rectifier circuit 520. A high-side lead of a first alternating current power source 510a is coupled to a low-side lead of the third voltage-controlled switch 533 and a high-side lead of the fourth voltage-controlled switch 534. A low-side lead of the first alternating current power source 510a is coupled to a low-side lead of the fifth voltage-controlled switch 535 and a high-side lead of the sixth voltage-controlled switch 536. In some embodiments, a capacitor 538 may be connected in series between the high-side lead of the first alternating current power source 510a and the low-side lead of the third voltage-controlled switch 533.

A high-side lead of a second alternating current power source 510b is coupled to a low-side lead of the first voltage-controlled switch 531 and a high-side lead of the second voltage-controlled switch 532. A low-side lead of the second alternating current power source 510b is coupled to a low-side lead of the second voltage-controlled switch 532 (e.g., a common ground reference of the rectifier circuit 520). In some embodiments, a capacitor 540 may be connected in series between the high-side lead of the second alternating current power source 510b and the low-side lead of the first voltage-controlled switch 531. Another capacitor 546 may be coupled to the low-side lead of the first alternating current power source 510a and the high-side lead of the second alternating current power source 510b.

The set of voltage-controlled switches of the rectifier circuit 520 may be operated in two modes. The sixth voltage-controlled switch 536 may controllably switch the rectifier circuit 520 between modes. For example, the sixth voltage-controlled switch 536 may be operably coupled to processing circuitry (e.g., processing circuitry 222 such as depicted in FIG. 2). The processing circuitry may monitor a condition of the power converter and operate the sixth voltage-controlled switch 536 according to the condition.

For example, in a first mode the first alternating current power source 510a may pass current through a full-wave bridge rectifier circuit formed with the third voltage-controlled switch 533, the fourth voltage-controlled switch 534, the fifth voltage-controlled switch 535, and the sixth voltage-controlled switch 536. The second alternating current power source 510b may simultaneously pass current through a voltage doubler rectifier circuit formed with the first voltage-controlled switch 531 and the second voltage-controlled switch 532.

In a second mode, the processing circuit causes the sixth voltage-controlled switch 536 to be pulled to ground. In this mode, the first alternating current power source 510a may pass current through a voltage doubler rectifier circuit formed with the third voltage-controlled switch 533 and the fourth voltage-controlled switch 534. The second alternating current power source 510b may simultaneously pass current through an impedance matching voltage doubler rectifier circuit formed with the two capacitors 546, 540, the first voltage-controlled switch 531, and the second voltage-controlled switch 532.

Accordingly, when the rectifier circuit 520 depicted in FIG. 5 switches to the second mode, the voltage output of the first alternating current power source 510a may be doubled, while the power output of the second alternating current power source 510b may be changed (e.g., increased). Therefore, the processing circuitry may control the interval and frequency of pulling the sixth voltage-controlled switch 536 to ground in order to control voltage and/or power output to the load 544. The interval and frequency may be controlled according to a monitored condition of the power converter, such as a voltage across one or both power sources 510a, 510b, a voltage at the load 544, a current at the load 544, a combination of these conditions, and so on.

Similar to the example rectifier circuit of FIG. 3, each voltage-controlled switch 531-536 may be a suitable switch, such as a MOSFET. In some embodiments, the voltage-controlled switches 531-536 can each be associated with a diode. The diodes may be discrete and separate elements from the voltage-controlled switches, while in other embodiments the diodes are implemented as body diodes within the voltage-controlled switches 531-536.

Figure 6:
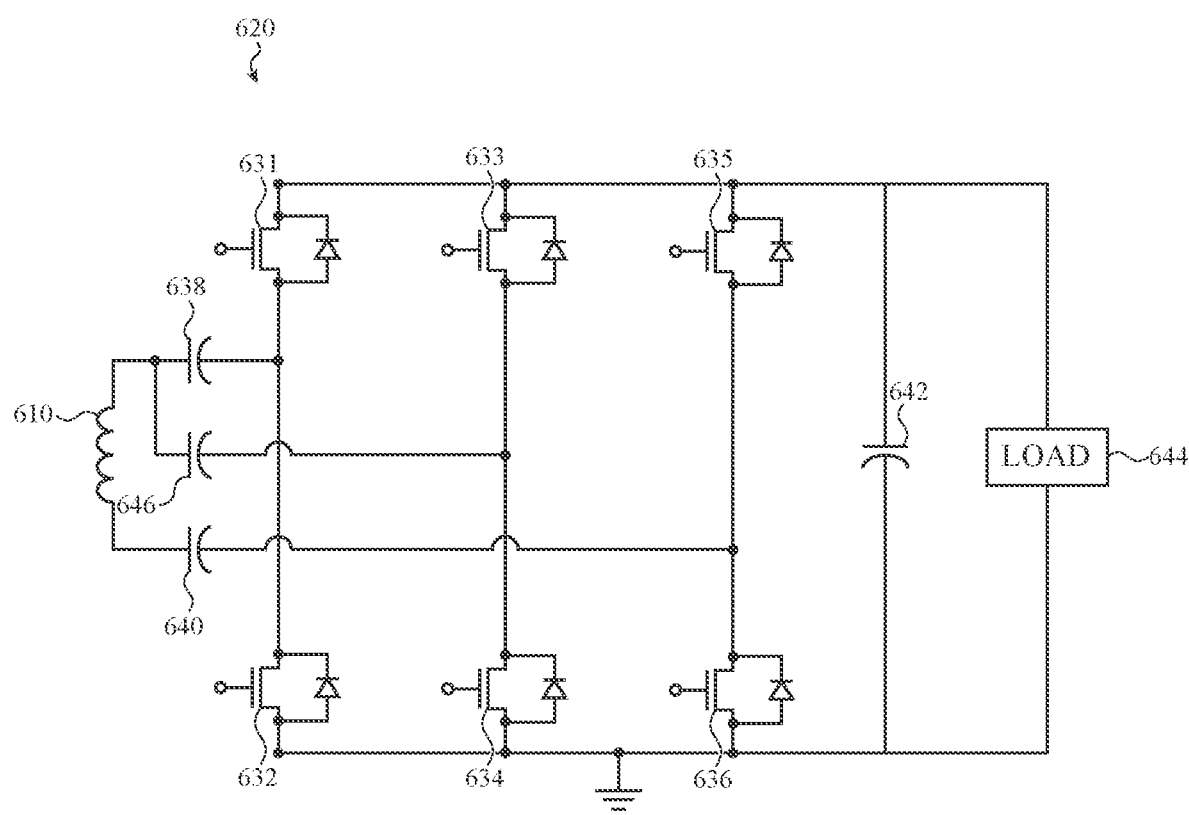
FIG. 6 depicts a simplified schematic diagram of another example rectifier of a power converter.

FIG. 6 depicts a simplified schematic diagram of an example rectifier of a power converter such as described herein. The rectifier circuit 620 receives input power from an alternating current power source 610 and rectifies the received current into a direct current output voltage having a substantially constant voltage (e.g., a rippled direct current voltage). The alternating current power source 610 may be an inductive receive coil such as depicted above with respect to FIGS. 1A-2, while in other embodiments the rectifier circuit 620 may receive input power through another source.

The rectifier circuit 620 includes a set of voltage-controlled switches 631-636. The set may include six voltage-controlled switches 631-636, and a conduction state of each voltage-controlled switch 631-636 may be toggled between an on-state and an off-state in order to rectify the input voltage. The voltage-controlled switches 631-636 are connected in parallel with the load 644 in pairs. A first voltage-controlled switch 631 and second voltage-controlled switch 632 are connected in series, with the pair being connected in parallel to the load 644. A third voltage-controlled switch 633 and fourth voltage-controlled switch 634 are connected in series, with the pair being connected in parallel to the load 644. A fifth voltage-controlled switch 635 and sixth voltage-controlled switch 636 are connected in series, with the pair being connected in parallel to the load 644.

The load 644 may be any arbitrary load configured to receive the rectified output voltage of the rectifier circuit 620 (e.g., the conditioning circuitry 224 and/or the load 226 as depicted in FIG. 2). In many cases, the output of the rectifier circuit 620 may be a rippled direct current voltage. An output capacitor 642 can be added in parallel to the load 644 to further smooth the rippled direct current waveform. The output capacitor 642 functions as a low-pass filter.

The alternating current power source 610 is coupled to the set of voltage-controlled switches of the rectifier circuit 620. A high-side lead of the alternating current power source 610 is coupled to a low-side lead of the first voltage-controlled switch 631 and a high-side lead of the second voltage-controlled switch 632. A low-side lead of the alternating current power source 610 is coupled to a low-side lead of the fifth voltage-controlled switch 635 and a high-side lead of the sixth voltage-controlled switch 636. A capacitor 638 is connected in series between the high-side lead of the alternating current power source 610 and the low-side lead of the first voltage-controlled switch 631. Another capacitor 646 is connected to the high-side lead of the alternating current power source 610 and the low-side lead of the third voltage-controlled switch 633. In some embodiments, yet another capacitor 640 may be connected in series between the low-side lead of the alternating current power source 610 and the low-side lead of the fifth voltage-controlled switch 635, though this is not required.

The set of voltage-controlled switches of the rectifier circuit 620 may be operated in multiple modes. Processing circuitry (e.g., processing circuitry 222 such as depicted in FIG. 2) may be coupled to one or more voltage-controlled switches to controllably switch the rectifier circuit 620 between modes. For example, the fourth voltage-controlled switch 634 and/or sixth voltage-controlled switch 636 may be toggled on or off to switch the mode of the rectifier circuit 620. The processing circuitry may monitor a condition of the power converter and operate the voltage-controlled switches 634, 636 according to the condition.

For example, in a first mode the alternating current power source 610 may pass current through a full-wave bridge rectifier circuit formed with the first voltage-controlled switch 631, the second voltage-controlled switch 632, the fifth voltage-controlled switch 635, and the sixth voltage-controlled switch 636. The capacitor 646 may be parallel to the capacitor 638, resulting in a first full-wave bridge rectifier circuit.

In a second mode the fourth voltage-controlled switch 634 may be pulled to ground. The alternating current power source 610 may again pass current through a full-wave bridge rectifier circuit formed with the first voltage-controlled switch 631, the second voltage-controlled switch 632, the fifth voltage-controlled switch 635, and the sixth voltage-controlled switch 636. The capacitor 646, however, may be parallel to the alternating current power source 610, resulting in a second full-wave bridge rectifier circuit having a different power output (e.g., an increased or decreased power output). Accordingly, the processing circuitry may control the interval and frequency of pulling the fourth voltage-controlled switch 634 to ground in order to control the power output to the load 644.

In a third mode the sixth voltage-controlled switch 636 may be pulled to ground. The alternating current power source 610 may pass current through a voltage doubler rectifier circuit formed with the first voltage-controlled switch 631 and the second voltage-controlled switch 632. Accordingly, the processing circuitry may control the interval and frequency of pulling the sixth voltage-controlled switch 636 to ground in order to control the voltage output to the load 644.

In a fourth mode the fourth voltage-controlled switch 634 and the sixth voltage-controlled switch 636 may be pulled to ground. The alternating current power source 610 may pass current through an impedance matching voltage doubler rectifier circuit formed with the capacitors 638, 646, the first voltage-controlled switch 631, and the second voltage-controlled switch 632. Accordingly, the processing circuitry may control the interval and frequency of pulling the fourth voltage-controlled switch 634 and/or the sixth voltage-controlled switch 636 to ground in order to control the voltage and/or power output to the load 644.

The processing circuitry may control the interval and frequency of toggling one or more of the voltage-controlled switches 631-636 in order to control voltage and/or power output to the load 644. The interval and frequency may be controlled according to a monitored condition of the power converter, such as a voltage across the alternating current power source 610, a voltage at the load 644, a current at the load 644, a combination of these conditions, and so on.

Similar to the example rectifier circuit of FIG. 3, each voltage-controlled switch 631-636 may be a suitable switch, such as a MOSFET. In some embodiments, the voltage-controlled switches 631-636 can each be associated with a diode. The diodes may be discrete and separate elements from the voltage-controlled switches, while in other embodiments the diodes are implemented as body diodes within the voltage-controlled switches 631-636.

Figure 7:
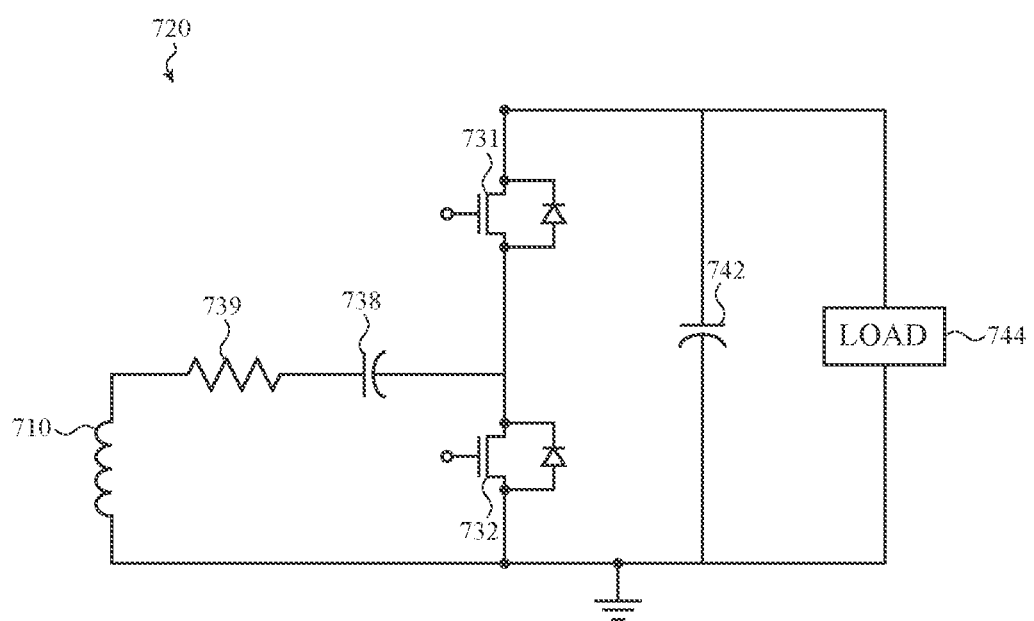
FIG. 7 depicts a simplified schematic diagram of another example rectifier of a power converter.

FIG. 7 depicts a simplified schematic diagram of an example rectifier of a power converter such as described herein. The rectifier circuit 720 is in the form of a boost rectifier circuit. The boost rectifier circuit 720 receives input power from an alternating current power source 710 and rectifies the received current into a direct current output voltage having a substantially constant voltage (e.g., a rippled direct current voltage). The alternating current power source 710 may be an inductive receive coil such as depicted above with respect to FIGS. 1A-2, while in other embodiments the boost rectifier circuit 720 may receive input power through another source.

The boost rectifier circuit 720 includes an output capacitor 742 coupled in parallel with two voltage-controlled switches 731, 732. A high-side lead of a first voltage-controlled switch 731 is coupled to a high-side lead of the output capacitor 742. A low-side lead of the first voltage-controlled switch 731 is coupled to a high-side lead of a second voltage-controlled switch 732. A low-side lead of the second voltage-controlled switch 732 is coupled to a low-side lead of the output capacitor 742. The boost rectifier circuit 720 may provide a rectified output to a load 744 across the leads of the output capacitor.

An alternating current input voltage may be supplied to the boost rectifier circuit 720 by an alternating current power source 710. The alternating current power source 710 may be an inductive receive coil such as depicted above with respect to FIGS. 1A-2, while in other embodiments the boost rectifier circuit 720 may receive input power through another source. A high-side lead of the alternating current power source 710 is coupled in series with a resistor 739 and a capacitor 738, which is in turn coupled to the low-side lead of the first voltage-controlled switch 731 and the high-side lead of the second voltage-controlled switch 732.

A load 744 is coupled to the output capacitor 742. The load 744 may be any arbitrary load configured to receive the rectified output voltage of the rectifier circuit 720 (e.g., the conditioning circuitry 224 and/or the load 226 as depicted in FIG. 2). In many cases, the load 744 has an impedance which varies over time (e.g., due to changing power consumption). The input voltage from the alternating current power source 710 may also vary (e.g., according to the coupling of the inductive receive coil with a transmit coil). Generally, the electronic device requires the voltage output to the load have a substantially constant voltage level (e.g., a rippled direct current voltage having a substantially constant voltage level).

Accordingly, the boost rectifier circuit 720 may controllably boost the output voltage up to double the peak input voltage. The level of the output voltage may be controlled by altering the operation timing (e.g., conduction state timing) of the voltage-controlled switches 731, 732. The voltage-controlled switches 731, 732 define two current paths. A first current path is defined when the first voltage-controlled switch 731 is opened and the second voltage-controlled switch 732 is closed. The first current path passes current through the resistor 739 and through the capacitor 738 to a ground reference (e.g., a local ground of the boost rectifier circuit 720 or a common ground of the electronic device).

At a full voltage doubling operation, the first current path may be operated during a negative voltage half-cycle of the alternating current input. Accordingly, during the negative half-cycle the capacitor 738 may be charged. After one or more voltage cycles of the alternating current input, the capacitor 738 may be charged up to the peak voltage of the alternating current input voltage.

A second current path through the boost rectifier circuit 720 is defined when the first voltage-controlled switch 731 is closed and the second voltage-controlled switch 732 is opened. The second current path passes current through the resistor 739 and through the capacitor 738 and outputs to the load 744.

Continuing the example of full voltage doubling operation, the second current path may be operated during a positive voltage half-cycle of the alternating current input. The boost rectifier circuit 720 may synchronously or near-synchronously cause the second voltage-controlled switch 732 to open and the first voltage-controlled switch 731 to close when the voltage level of the alternating current power source 710 crosses zero volts between the negative half-cycle and the positive half-cycle (and vice versa when switching from the positive half-cycle to the negative half-cycle). During the positive half-cycle the alternating current power source 710 and the capacitor 738 may be placed in parallel to the output capacitor 742. As a result, the output capacitor 742 may be charged, and after one or more voltage cycles of the alternating current input the output capacitor 742 may be charged up to double the peak voltage of the alternating current input voltage.

In order to control the boost level of the boost rectifier circuit 720, the timing of operating the first current path and the second current path may be adjusted. For example, the first current path may be operated through the negative half-cycle and a portion of the positive half-cycle. This may charge the capacitor 738 to a voltage below the peak voltage level of the alternating current input after one or more voltage cycles. The second current path may be operated through the remaining portion of the positive half-cycle, and may consequently charge the output capacitor to a voltage level that is less than double the peak voltage of the alternating current input.

The timing of operating the first current path and the second current path of the boost rectifier circuit 720 may be controlled by processing circuitry (e.g., processing circuitry 222 such as depicted in FIG. 2). The processing circuitry may monitor a power condition associated with the power converter incorporating the boost rectifier circuit 720 (e.g., an input voltage level, an output voltage level, an impedance at the output, etc.) and adjust the operation timing accordingly. For example, if the processing circuitry detects a drop in voltage across the load 744 (e.g., due to an increased impedance of the load 744), the timing may be adjusted to increase the output voltage across the output capacitor 742.

Similar to the example rectifier circuit of FIG. 3, each voltage-controlled switch 731, 732 may be a suitable switch, such as a MOSFET. In some embodiments, the voltage-controlled switches 731, 732 can each be associated with a diode. The diodes may be discrete and separate elements from the voltage-controlled switches, while in other embodiments the diodes are implemented as body diodes within the voltage-controlled switches 731, 732.

Figure 8:
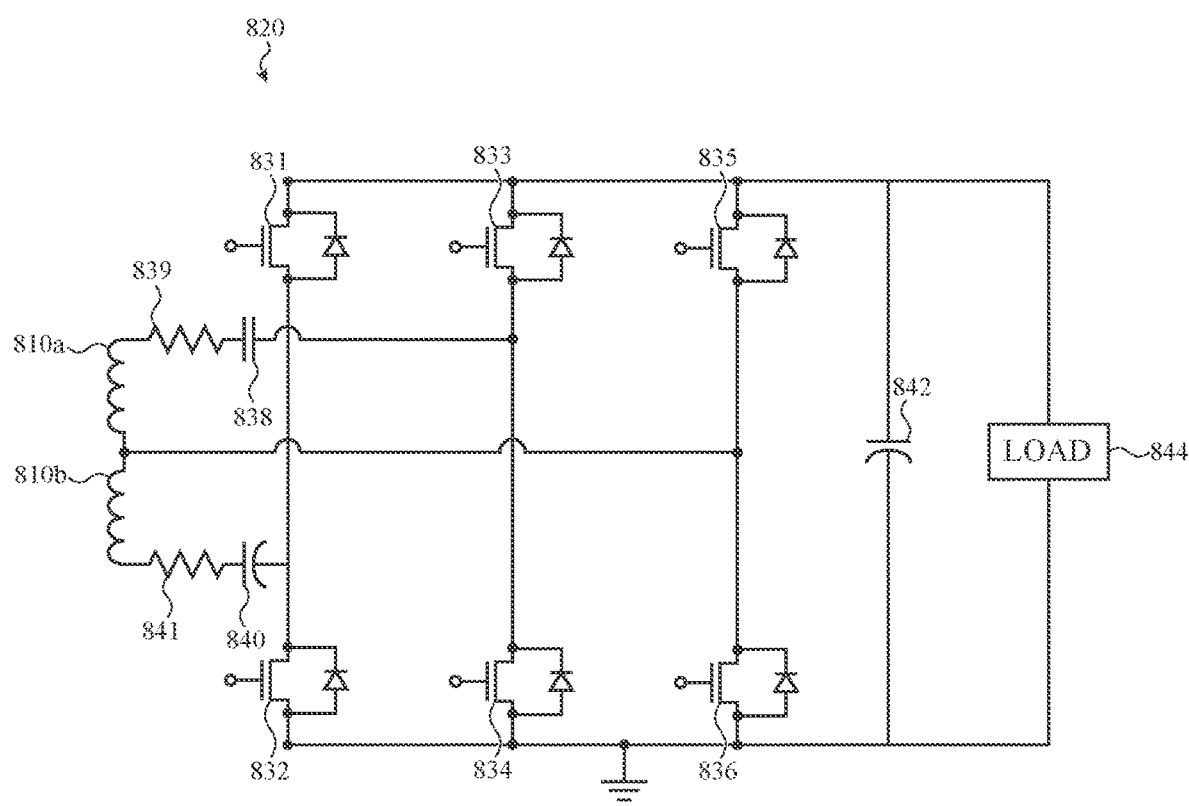
FIG. 8 depicts a simplified schematic diagram of another example rectifier of a power converter.

FIG. 8 depicts a simplified schematic diagram of an example rectifier of a power converter such as described herein. The rectifier circuit 820 may be a multi-mode rectifier, such as depicted above with respect to FIG. 3, and in one of the modes the rectifier circuit 820 may operate as a boost rectifier, such as depicted above with respect to FIG. 7. Accordingly, the rectifier circuit 820 receives input power from two alternating current power sources 810a, 810b and rectifies the received current into a direct current output voltage having a substantially constant voltage (e.g., a rippled direct current voltage). The alternating current power sources 810a, 810b may be inductive receive coils such as depicted above with respect to FIGS. 1A-2, while in other embodiments the power sources 810a, 810b may receive power through another source. In some embodiments each alternating current power source 810a, 810b is a separate receive coil, while in other embodiments the power sources 810a, 810b may represent portions of a center-tapped receive coil.

The rectifier circuit 820 includes a set of voltage-controlled switches 831-836. The set may include six voltage-controlled switches 831-836, and a conduction state of each voltage-controlled switch 831-836 may be toggled between an on-state and an off-state in order to rectify the input voltage. The voltage-controlled switches 831-836 are connected in parallel with the load 844 in pairs. A first voltage-controlled switch 831 and second voltage-controlled switch 832 are connected in series, with the pair being connected in parallel to the load 844. A third voltage-controlled switch 833 and fourth voltage-controlled switch 834 are connected in series, with the pair being connected in parallel to the load 844. A fifth voltage-controlled switch 835 and sixth voltage-controlled switch 836 are connected in series, with the pair being connected in parallel to the load 844.

The load 844 may be any arbitrary load configured to receive the rectified output voltage of the rectifier circuit 820 (e.g., the conditioning circuitry 224 and/or the load 226 as depicted in FIG. 2). In many cases, the output of the rectifier circuit 820 may be a rippled direct current voltage. An output capacitor 842 can be added in parallel to the load 844 to further smooth the rippled direct current waveform. The output capacitor 842 functions as a low-pass filter.

The alternating current power sources 810a, 810b are coupled to the set of voltage-controlled switches of the rectifier circuit 820. A high-side lead of a first alternating current power source 810a is coupled to a low-side lead of the third voltage-controlled switch 833 and a high-side lead of the fourth voltage-controlled switch 834. A low-side lead of the first alternating current power source 810a is coupled to a low-side lead of the fifth voltage-controlled switch 835 and a high-side lead of the sixth voltage-controlled switch 836. A resistor 839 and a capacitor 838 are connected in series between the high-side lead of the first alternating current power source 810a and the low-side lead of the third voltage-controlled switch 833.

A high-side lead of a second alternating current power source 810b is coupled to a low-side lead of the fifth voltage-controlled switch 835 and a high-side lead of the sixth voltage-controlled switch 836. A low-side lead of the second alternating current power source 810b is coupled to a low-side lead of the first voltage-controlled switch 831 and a high-side lead of the second voltage-controlled switch 832. A resistor 841 and a capacitor 840 are connected in series between the low-side lead of the second alternating current power source 810b and the low-side lead of the first voltage-controlled switch 831.

The set of voltage-controlled switches of the rectifier circuit 820 may be operated in a full-wave rectifier mode and a boost rectifier mode. The sixth voltage-controlled switch 836 may controllably switch the rectifier circuit 820 between modes. For example, the sixth voltage-controlled switch 836 may be operably coupled to processing circuitry (e.g., processing circuitry 222 such as depicted in FIG. 2). The processing circuitry may monitor a condition of the power converter and operate the sixth voltage-controlled switch 836 according to the condition.

For example, the processing circuitry may monitor a voltage across the load 844. The processing circuitry may typically operate the sixth voltage-controlled switch 836 in a full-wave rectifying mode. In the full-wave rectifying mode, the first alternating current power source 810a may pass current through a full-wave bridge rectifier circuit formed with the third voltage-controlled switch 833, the fourth voltage-controlled switch 834, the fifth voltage-controlled switch 835, and the sixth voltage-controlled switch 836.

In the full-wave rectifying mode, the second alternating current power source 810b may simultaneously pass current through a full-wave bridge rectifier circuit formed with the first voltage-controlled switch 831, the second voltage-controlled switch 832, the fifth voltage-controlled switch 835, and the sixth voltage-controlled switch 836.

If the voltage across the load 844 falls below a threshold (e.g., due to an increased impedance at the load 844), the processing circuit may operate the sixth voltage-controlled switch 836 in a boost rectifier mode. In the boost rectifier mode, the sixth voltage-controlled switch 836 is pulled to ground and the first alternating current power source 810a may pass current through a boost rectifier circuit formed with the third voltage-controlled switch 833 and the fourth voltage-controlled switch 835.

In the boost rectifier mode, the second alternating current power source 810b may simultaneously pass current through a boost rectifier circuit formed with the first voltage-controlled switch 831 and the second voltage-controlled switch 832. The boost rectifiers may be operated in a manner as discussed above in FIG. 7. In some cases, the boost rectifiers are operated with the same boost level, while in other embodiments each boost rectifier is operated independently.

Similar to the example rectifier circuit of FIG. 3, each voltage-controlled switch 831, 832 may be a suitable switch, such as a MOSFET. In some embodiments, the voltage-controlled switches 831, 832 can each be associated with a diode. The diodes may be discrete and separate elements from the voltage-controlled switches, while in other embodiments the diodes are implemented as body diodes within the voltage-controlled switches 831, 832.

Figure 9:
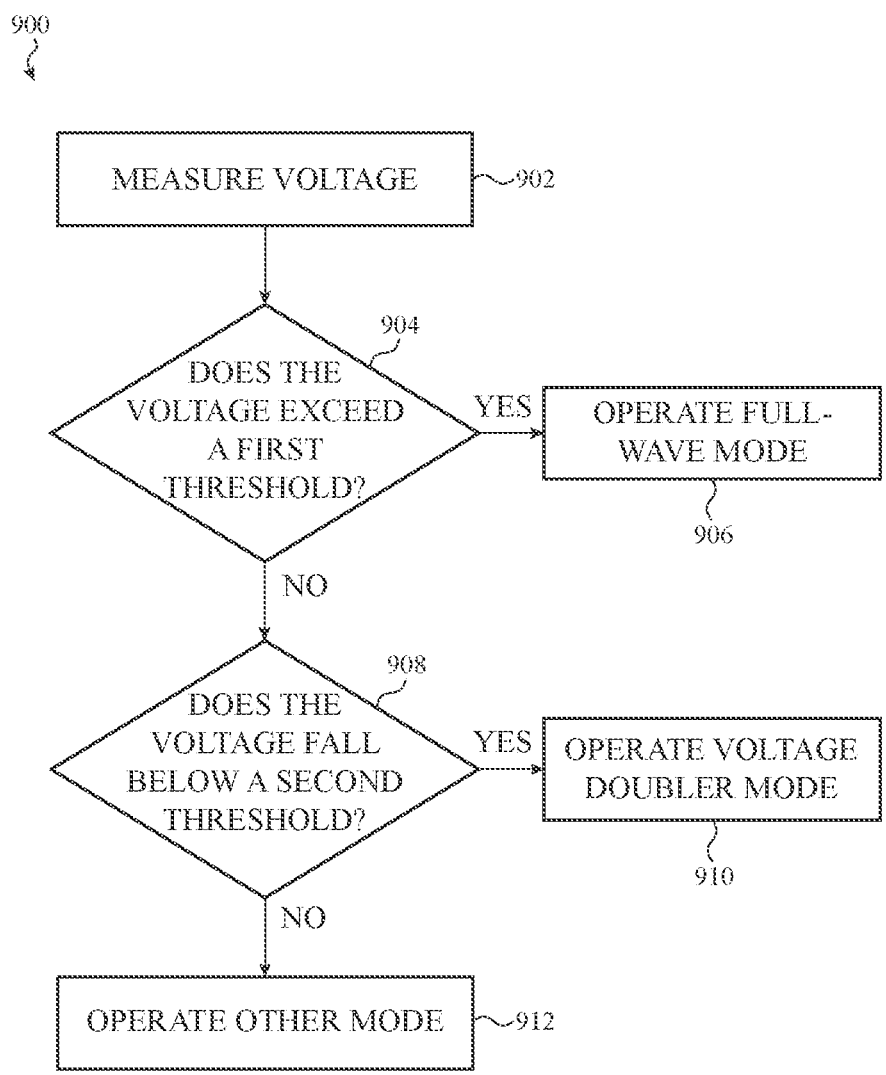
FIG. 9 depicts an example process for rectifying an alternating current.

FIG. 9 depicts an example process 900 for rectifying an alternating current. The process 900 may be implemented on any of the example power converters and/or devices discussed above with respect to FIGS. 1-8. The following process 900 may be used to convert voltage from one or more alternating current sources into a regulated direct current voltage level suitable for use by an electronic device using, for example, the rectifier circuit described with respect to FIGS. 2-8 and/or the processing circuitry described with respect to FIG. 2. In some embodiments, the process 900 may be implemented as processor-executable instructions that are stored within a memory of an electronic device having a rectifier circuit.

In operation 902, an incoming voltage is measured. The incoming voltage may be a single voltage from a single source, or multiple voltages may be measured from multiple sources. In many cases, the incoming voltage is from one or more alternating current sources. The incoming voltage may be measured by a sensor, circuit, or similar element associated with the alternating current source. In many embodiments, the alternating current source is an inductive receive coil or similar element configured to receive wirelessly transmitted power. For example, the incoming voltage may be measured by coupling a voltage measuring circuit to a pair of nodes of the inductive receive coil. In some embodiments, the voltage measuring circuit forms part of processing circuitry.

In operation 904, a determination is made whether the measured voltage exceeds a first threshold value. In many embodiments, the measured voltage may be monitored by processing circuitry (e.g., the processing circuitry 222 such as depicted in FIG. 2). In operation 904 the processing circuitry may determine whether the measured voltage exceeds a first threshold value (e.g., a fixed or variable/programmable threshold). If the voltage exceeds the first threshold value, the method may move to operation 906. If the voltage does not exceed the first threshold value, the method may move to operation 908.

In operation 906, in response to determining that the measured voltage exceeds the first threshold value, the incoming voltage is rectified in a full-wave rectifying mode. In many embodiments, the processing circuitry may further cause a rectifying circuit (e.g., the rectifying circuit such as depicted in FIG. 3, FIG. 4, FIG. 5, FIG. 6, or FIG. 8) to operate in a full-wave rectifying mode. For example, the processing circuitry may cause the incoming alternating current to pass through a full-wave bridge rectifying circuit.

In operation 908, in response to determining that the measured voltage does not exceed the first threshold value, a determination is made whether the measured voltage falls below a second threshold value. In some embodiments, the first threshold value and the second threshold value may be the same value. In these embodiments, there may be no additional determination at operation 908, and the method may directly move to operation 910. In other embodiments, the processing circuitry may make a further determination whether the measured voltage falls below a second threshold value (e.g., a fixed or variable/programmable threshold). If the voltage falls below the first threshold value, the method may move to operation 910. If the voltage does not fall below the first threshold value, the method may move to operation 912.

In operation 910, in response to determining that the measured voltage falls below the first threshold value, the incoming voltage is rectified in a voltage doubler rectifying mode. In many embodiments, the processing circuitry may further cause a rectifying circuit (e.g., the rectifying circuit such as depicted in FIG. 3, FIG. 4, FIG. 5, or FIG. 6) to operate in a voltage doubler rectifying mode. For example, the processing circuitry may cause the incoming alternating current to pass through a voltage doubler rectifying circuit.

In operation 912, in response to determining that the measured voltage does not fall below the threshold value, the incoming voltage may be rectified in another mode. In some cases, the rectifier circuit may at the time of the determination be operating in a full-wave rectifying mode. In these cases the full-wave rectifying mode may be maintained, or the rectifier circuit may be temporarily operated in another mode, such as a voltage doubler rectifying mode, then operated in the full-wave rectifying mode. In this manner, the rectifier circuit may be controlled to maintain a constant output voltage.

In other cases, the rectifier circuit may at the time of the determination be operating in a voltage doubler rectifying mode. In these cases the voltage doubler rectifying mode may be maintained, or the rectifier circuit may be temporarily operated in another mode, such as a full-wave rectifying mode, then operated in the voltage doubler rectifying mode. In this manner, the rectifier circuit may be controlled to maintain a constant output voltage.

Many embodiments of the foregoing disclosure may include or may be described in relation to various methods of operation, use, manufacture, and so on. Notably, the operations of methods presented herein are meant only to be exemplary and, accordingly, are not necessarily exhaustive. For example an alternate operation order or fewer or additional steps may be required or desired for particular embodiments.

Figure 10:
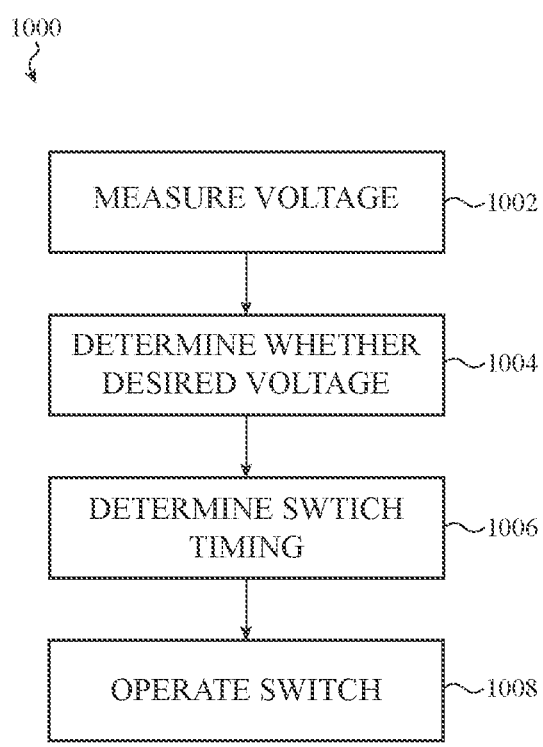
FIG. 10 depicts another example process for rectifying an alternating current.

FIG. 10 depicts another example process 1000 for rectifying an alternating current. The process 1000 may be implemented on any of the example power converters and/or devices discussed above with respect to FIGS. 1-8. The following process 1000 may be used to convert voltage from one or more alternating current sources into a regulated direct current voltage level suitable for use by an electronic device using, for example, the rectifier circuit described with respect to FIGS. 2-8 and/or the processing circuitry described with respect to FIG. 2. In some embodiments, the process 1000 may be implemented as processor-executable instructions that are stored within a memory of an electronic device having a rectifier circuit.

In operation 1002, a voltage associated with a power converter is measured. The measured voltage may be an input voltage to the power converter, or an output voltage from the power converter. An input voltage may be a single voltage from a single source, or multiple voltages may be measured from multiple sources. In many cases, the input voltage is from one or more alternating current sources. The output voltage may be connected to a load with a variable impedance. In either case, the voltage may be measured by a sensor, circuit, or similar element associated with the power converter. For example, the voltage may be measured by coupling a voltage measuring circuit to a pair of input or output nodes of the power converter. In some embodiments, the voltage measuring circuit forms part of processing circuitry.

In operation 1004, a determination is made whether the measured voltage is at a desired level. In many embodiments, the measured voltage may be monitored by processing circuitry (e.g., the processing circuitry 222 such as depicted in FIG. 2). In operation 1004 the processing circuitry may determine whether the measured voltage is at a desired level (e.g., whether it falls within a particular range). If the voltage is above or below the desired level, the method may move to operation 1006.

In operation 1006, in response to determining whether the measured voltage is above or below the desired voltage level, switch timing for rectifying the input voltage is determined. The input voltage may be boost rectified by adjusting the timing of one or more rectifying switches. The rectifying switches may be implemented in a rectifying circuit (e.g., the rectifying circuit such as depicted in FIG. 7 or FIG. 8). For example, if the measured voltage is below the desired voltage level, one of the switches may be held closed for a longer portion of each input current cycle, while another is held closed for a shorter portion of each input current cycle. This may cause an increase in a rectified output voltage level. The switch timing may be determined as a function of the desired rectified output voltage level relative to the measured voltage level.

In operation 1008, in response to determining the switch timing, the one or more rectifying switches are operated according to the determined switch timing. Accordingly, the output voltage level may be boosted or have its boost level reduced.

Many embodiments of the foregoing disclosure may include or may be described in relation to various methods of operation, use, manufacture, and so on. Notably, the operations of methods presented herein are meant only to be exemplary and, accordingly, are not necessarily exhaustive. For example an alternate operation order or fewer or additional steps may be required or desired for particular embodiments.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A power converter, comprising:
    a first inductive coil configured to output a first induced current;
    a second inductive coil configured to output a second induced current;
    a rectifier circuit coupled to the first inductive coil and the second inductive coil and comprising a set of voltage-controlled switches, the rectifier circuit configured to operate in a full-wave rectifying mode and a voltage doubler rectifying mode; and
    processing circuitry configured to:
        cause the rectifier circuit to switch between the full-wave rectifying mode and the voltage doubler rectifying mode;
        monitor a voltage at the first inductive coil; and
        cause the rectifier circuit to switch to the voltage doubler rectifying mode in response to the voltage being below a threshold;
    wherein the rectifier circuit is configured to switch between the full-wave rectifying mode and the voltage doubler rectifying mode by selectively controlling a conduction state of each voltage-controlled switch of the set of voltage-controlled switches.

2. The power converter of claim 1, wherein the processing circuitry is further configured to:
    cause the rectifier circuit to switch to the full-wave rectifying mode in response to the voltage exceeding the threshold.

3. The power converter of claim 1, wherein the rectifier circuit is configured to:
    controllably pass the first induced current through a full-wave bridge rectifying circuit or a first voltage doubler rectifying circuit; and
    pass the second induced current through a second voltage doubler rectifying circuit.

4. The power converter of claim 1, wherein the rectifier circuit is configured to:
    controllably pass the first induced current through a first full-wave bridge rectifying circuit or a first voltage doubler rectifying circuit; and
    controllably pass the second induced current through a second full-wave bridge rectifying circuit or a second voltage doubler rectifying circuit.

5. The power converter of claim 4, wherein the rectifier circuit is configured to simultaneously pass the first induced current through the first full-wave bridge rectifying circuit and pass the second induced current through the second full-wave bridge rectifying circuit.

6. The power converter of claim 1, wherein the rectifier circuit is configured to:
    controllably pass the first induced current through a full-wave bridge rectifying circuit or a first voltage doubler rectifying circuit; and
    controllably pass the second induced current through a second voltage doubler rectifying circuit or an impedance matching voltage doubler rectifying circuit.

7. The power converter of claim 1, wherein each of the set of voltage-controlled switches comprises a MOSFET.

8. The power converter of claim 7, wherein:
the processing circuitry is configured to cause the rectifier circuit to switch to the voltage doubler rectifying mode by toggling and holding one of the set of voltage-controlled switches in an on-state.

9. The power converter of claim 1, wherein:
the rectifier circuit further comprises a capacitor coupled to a high-side lead of an input to the rectifier circuit;
the set of voltage-controlled switches comprises:
  a first voltage-controlled switch coupled to the capacitor and a low-side lead of the input; and
  a second voltage-controlled switch coupled to the capacitor and a high-side lead of an output capacitor; and
the processing circuitry is configured to operate a turn-on timing and a turn-off timing of the first voltage-controlled switch and the second voltage-controlled switch; wherein
  the first voltage-controlled switch is turned off while the second voltage-controlled switch is turned on; and
  the second voltage-controlled switch is turned on during at least half of a voltage cycle of an alternating current input signal applied to the rectifier circuit.

10. The power converter of claim 9, wherein the processing circuitry is further configured to monitor an output voltage from the rectifier circuit.

11. The power converter of claim 10, wherein in response to an increase in the output voltage the second voltage-controlled switch is turned on for a longer duration.

12. The power converter of claim 10, wherein in response to a decrease in the output voltage the second voltage-controlled switch is turned on for a shorter duration.

13. The power converter of claim 9, wherein each of the first voltage-controlled switch and the second voltage-controlled switch comprises a MOSFET.

14. The power converter of claim 1, wherein the first inductive coil and the second inductive coil comprise wireless power receivers.

15. A method of rectifying an alternating current, comprising:
operating a first inductive coil to output a first induced current;
operating a second inductive coil to output a second induced current;
operating a rectifier circuit, coupled to the first inductive coil and the second inductive coil, in a full-wave rectifying mode or a voltage doubler rectifying mode;
measuring an incoming voltage to a rectifier;
operating the rectifier in the full-wave rectifying mode in response to the measured incoming voltage exceeding a first threshold; and
operating the rectifier in the voltage doubler rectifying mode in response to the measured incoming voltage falling below a second threshold.

16. The method of claim 15, wherein the first threshold is the same as the second threshold.

17. The method of claim 15, wherein the first threshold is higher than the second threshold.

18. The method of claim 15, wherein the voltage doubler rectifying mode is an impedance matching voltage doubler rectifying mode.

19. The method of claim 15, wherein the rectifier comprises a set of voltage-controlled switches.

20. The method of claim 19, wherein the operating the rectifier circuit in the voltage doubler rectifying mode comprises toggling and holding one of the set of voltage-controlled switches in an on-state.

* * * * *